US012409661B2

(12) United States Patent
Kosaka et al.

(10) Patent No.: US 12,409,661 B2
(45) Date of Patent: Sep. 9, 2025

(54) LIQUID DISCHARGE APPARATUS AND CONTROL METHOD THEREOF

(71) Applicant: CANON KABUSHIKI KAISHA, Tokyo (JP)

(72) Inventors: Kei Kosaka, Tokyo (JP); Tetsuya Narazaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/490,658

(22) Filed: Oct. 19, 2023

(65) Prior Publication Data

US 2024/0042767 A1 Feb. 8, 2024

Related U.S. Application Data

(63) Continuation of application No. 17/495,653, filed on Oct. 6, 2021, now Pat. No. 11,827,023.

(30) Foreign Application Priority Data

Oct. 14, 2020 (JP) ................................ 2020-173540

(51) Int. Cl.

*B41J 2/175* (2006.01)
*B41J 2/165* (2006.01)
*B41J 2/17* (2006.01)

(52) U.S. Cl.

CPC ......... *B41J 2/1721* (2013.01); *B41J 2/16505* (2013.01); *B41J 2/1652* (2013.01); (Continued)

(58) Field of Classification Search

CPC .... B41J 2/1721; B41J 2/16505; B41J 2/1652; B41J 2/16523; B41J 2/16532; B41J 2002/16594

See application file for complete search history.

(56) References Cited

U.S. PATENT DOCUMENTS 5,248,999 A 9/1993 Mochizuki et al. ...... 346/140 R
7,249,824 B2 7/2007 Ogawa et al. ........... B41J 2/175

(Continued)

FOREIGN PATENT DOCUMENTS

JP H05-201027 8/1993
JP 2002-331685 11/2002

(Continued)

OTHER PUBLICATIONS

Office Action dated May 24, 2024 in counterpart Japanese Application No. 2020-173540, together with English translation thereof.

(Continued)

*Primary Examiner* — Sharon Polk

(74) *Attorney, Agent, or Firm* — Venable LLP

(57) ABSTRACT

A liquid discharge apparatus includes a print head with a nozzle discharging a liquid, a pump to suction the liquid from the nozzle, and to eject the liquid into a waste liquid tank, a control unit to change a driving amount of the pump to control an amount of the liquid ejected, and a calculation unit to calculate an amount of the liquid in the tank. The control unit drives the pump by a second driving amount less than a first, if a sum of an amount of the liquid ejected when the pump is driven by the first driving amount and an amount of the liquid in the waste liquid tank is equal to or greater than a predetermined amount. The calculation unit calculates a cumulative amount of the liquid suctioned by the pump from the nozzle as the amount of the liquid in the waste liquid tank.

15 Claims, 21 Drawing Sheets

(52) U.S. Cl.
CPC ....... *B41J 2/16523* (2013.01); *B41J 2/16532* (2013.01); *B41J 2002/16594* (2013.01)

(56) References Cited

U.S. PATENT DOCUMENTS

| | | | | |
|---|---|---|---|---|
| 9,108,410 | B2 | 8/2015 | Hamasaki et al. | B41J 11/008 |
| 9,446,595 | B2 | 9/2016 | Takarabe et al. | B41J 2/1652 |
| 9,517,628 | B2 | 12/2016 | Tenkawa et al. | B41J 2/17566 |
| 10,207,506 | B2 | 2/2019 | Iwasaki et al. | B41J 2/16508 |
| 10,427,410 | B2 | 10/2019 | Nakagawa et al. | B41J 2/165 |
| 10,427,411 | B2 | 10/2019 | Kosaka et al. | B41J 2/165 |
| 11,192,379 | B2 | 12/2021 | Narazaki et al. | B41J 2/17509 |
| 11,827,023 | B2 * | 11/2023 | Kosaka | B41J 29/38 |
| 2005/0140750 | A1 | 6/2005 | Ogawa et al. | B41J 2/175 |
| 2008/0174631 | A1 | 7/2008 | Habashi | B41J 2/165 |
| 2009/0237430 | A1 | 9/2009 | Tatsumi | B41J 29/393 |
| 2018/0154630 | A1 | 6/2018 | Takahashi et al. | B41J 2/04563 |
| 2020/0290352 | A1 | 9/2020 | Akiyama et al. | B41J 2/14 |
| 2020/0316936 | A1 | 10/2020 | Yaita et al. | B41J 2/04653 |
| 2022/0111651 | A1 | 4/2022 | Narazaki et al. | B41J 2/165 |

FOREIGN PATENT DOCUMENTS

| | | |
|---|---|---|
| JP | 2005-193388 | 7/2005 |
| JP | 2008-238614 | 10/2008 |
| JP | 4841217 B2 | 12/2011 |
| JP | 2014-188859 | 10/2014 |
| JP | 2017-080916 | 5/2017 |
| JP | 2018-89834 | 6/2018 |
| JP | 2019-034547 | 3/2019 |

OTHER PUBLICATIONS

Notice of Reasons for Refusal issued Jul. 4, 2025, in corresponding Japanese Patent Application No. 2024-164102, with English translation (9 pages).

* cited by examiner

FIG. 9

| RECOVERY FLAG | Ncln | SEPARATE SUCTION FOR BK | | | SEPARATE SUCTION FOR CL | | |
|---|---|---|---|---|---|---|---|
| | | DRIVING AMOUNT | DRIVING SPEED | NUMBER OF TIMES OF DRIVING | DRIVING AMOUNT | DRIVING SPEED | NUMBER OF TIMES OF DRIVING |
| SYSTEM CLEANING SC2 | 2 | X2 | Y1 | 1 | X4 | Y1 | 1 |
| SYSTEM CLEANING SC1 | 1 | X1 | Y1 | 1 | X3 | Y1 | 1 |

FIG. 10

| | AMOUNT OF UNEVAPORATED WASTE INK |
|---|---|
| WASTE INK FULL ERROR THRESHOLD VALUE | 100 |
| SYSTEM CLEANING SC2 | 50 |
| SYSTEM CLEANING SC1 | 25 |

| | FILLING RATIO | PERIOD UNTIL NEXT SYSTEM CLEANING (typ) |
|---|---|---|
| SYSTEM CLEANING SC2 | 100% | 2 YEARS |
| SYSTEM CLEANING SC1 | 50% | 1 YEAR |

FIG. 19

| RECOVERY FLAG | Ncln | SIMULTANEOUS SUCTION FOR BK/CL | | | SEPARATE SUCTION FOR CL | | |
|---|---|---|---|---|---|---|---|
| | | DRIVING AMOUNT | DRIVING SPEED | NUMBER OF TIMES OF DRIVING | DRIVING AMOUNT | DRIVING SPEED | NUMBER OF TIMES OF DRIVING |
| SYSTEM CLEANING SC2 | 2 | X2 | Y1 | 1 | X2 | Y1 | 1 |
| SYSTEM CLEANING SC1 | 1 | X1 | Y1 | 1 | X1 | Y1 | 1 |

FIG. 20

| | AMOUNT OF UNEVAPORATED WASTE INK | AMOUNT OF EVAPORATED WASTE INK |
|---|---|---|
| WASTE INK FULL ERROR THRESHOLD VALUE | – | 100 |
| SYSTEM CLEANING SC2 | 50 | 25 |
| SYSTEM CLEANING SC1 | 25 | 12.5 |

LIQUID DISCHARGE APPARATUS AND CONTROL METHOD THEREOF

This application is a continuation of application Ser. No. 17/495,653 filed Oct. 6, 2021, currently pending; and claims priority under 35 U.S.C. § 119 to Japan Application JP 2020-173540 filed in Japan on Oct. 14, 2020; and the contents of all of which are incorporated herein by reference as if set forth in full.

BACKGROUND OF THE INVENTION

Cross-Reference to Priority Application

This application claims the benefit of Japanese Patent Application No. 2020-173540, filed Oct. 14, 2020, which is hereby incorporated by reference herein in its entirety.

Field of the Invention

The present invention relates to a liquid discharge apparatus and a control method thereof.

Description of the Related Art

Conventionally, in liquid discharge apparatuses typified by inkjet printing apparatuses, there are cases where a recovery process of a discharge head that discharges a liquid is executed. For example, in inkjet printing apparatuses, in order to prevent discharge failure due to air bubbles generated in an ink flow path, a recovery process of a print head may be executed. As an example of such a recovery process, a process in which ink is suctioned from a nozzle of a print head by a pump, and the suctioned ink is discharged to a waste ink tank as waste ink can be given. Japanese Patent Laid-Open No. 5-201027 discloses that when a discharge failure of a print head occurs, a suction pump is operated in accordance with a user's instruction to execute a recovery process of the print head. Also, Japanese Patent Laid-Open No. 5-201027 discloses that when the amount of waste ink in a waste ink tank exceeds a predetermined amount, the pump will not be operated, that is, the recovery process will not be executed, even if the recovery process is instructed by the user.

SUMMARY OF THE INVENTION

According to one embodiment of the present invention, a liquid discharge apparatus includes a print head including a nozzle that discharges a liquid, a recovery unit including a cap that caps the nozzle and a pump that suctions a liquid from the nozzle via the cap, and configured to discharge to a waste liquid tank that accommodates a waste liquid of suctioned liquid, and a control unit configured to cause the recovery unit to execute at least one of a first recovery operation, in which the suction pump is driven at a first driving amount, or a second recovery operation, in which the pump is driven at a second driving amount less than the first driving amount, based on an amount of waste liquid discharged to the waste liquid tank.

According to another embodiment of the present invention, a method of controlling a liquid discharge apparatus, the apparatus comprising a print head including a nozzle that discharges a liquid, and a recovery unit including a cap that caps the nozzle and a pump that suctions a liquid from the nozzle via the cap, and configured to discharge to a waste liquid tank that accommodates a waste liquid of suctioned liquid, the method comprising causing the recovery unit to execute at least one of a first recovery operation, in which the suction pump is driven at a first driving amount, or a second recovery operation, in which the pump is driven at a second driving amount less than the first driving amount, based on an amount of waste liquid discharged to the waste liquid tank.

According to still another embodiment of the present invention, a liquid discharge apparatus comprises a print head including a nozzle that discharges a liquid, a cap configured to cap the nozzle, a pump configured to suction a liquid from the nozzle via the cap, a waste liquid tank configured to accommodate the liquid suctioned by the pump, and a control unit configured to control the pump, wherein the control unit, by changing a driving amount without changing the number of times of driving of the pump based on information related to the amount that the waste liquid tank can accommodate, changes a suction amount of liquid by the pump.

Further features of the present invention will become apparent from the following description of exemplary embodiments (with reference to the attached drawings).

BRIEF DESCRIPTION OF THE DRAWINGS

FIG. 9 is a view illustrating suction parameters for system cleaning.

FIG. 10 is a view illustrating waste ink tank usage ratios of system cleaning.

FIG. 19 is a view illustrating suction parameters for system cleaning.

FIG. 20 is a view illustrating waste ink tank usage ratios of system cleaning.

DESCRIPTION OF THE EMBODIMENTS

Figure 1:
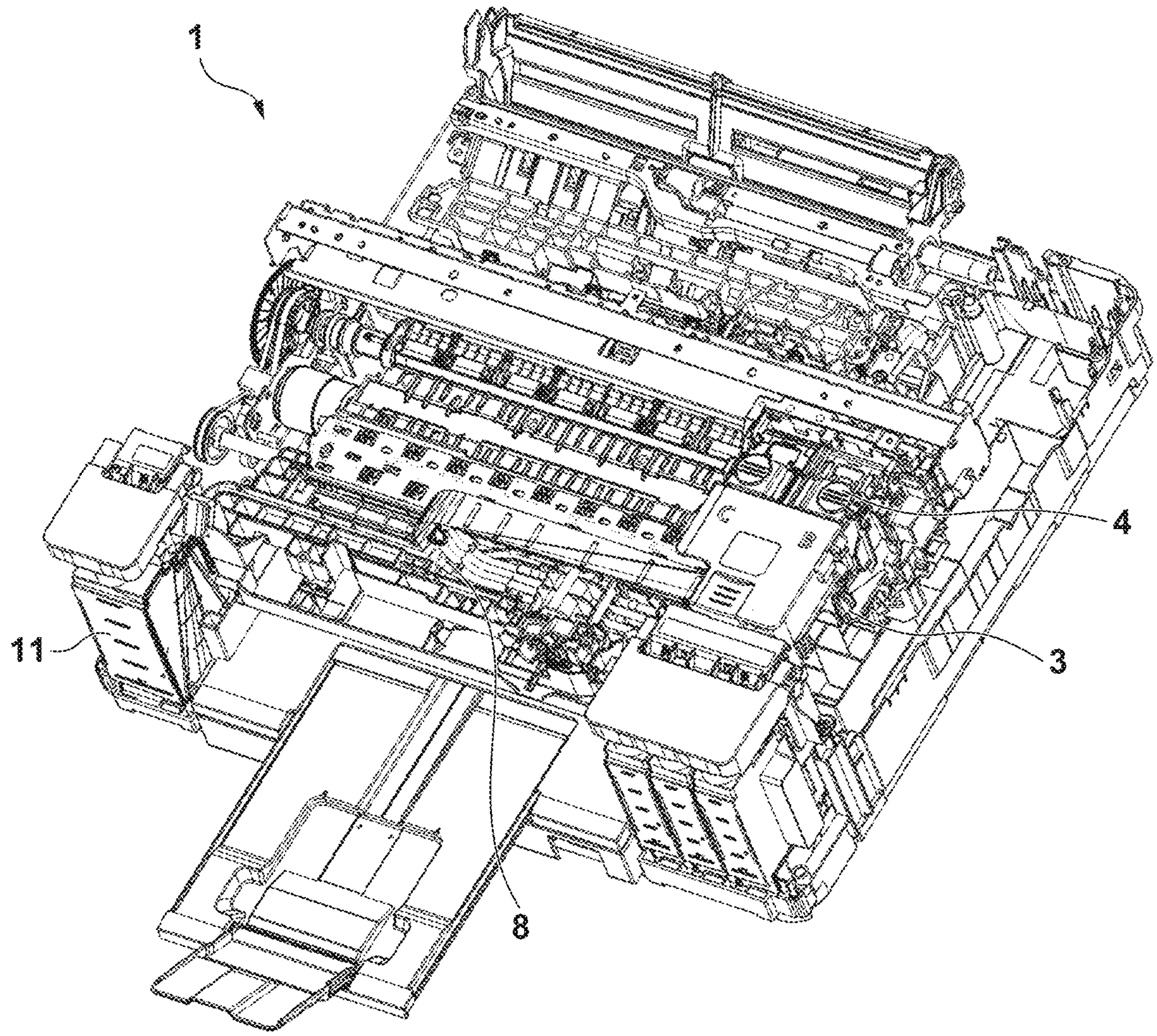
FIG. 1 is a perspective view of an inkjet printing apparatus according to an embodiment.

In the above-described prior art, there are cases when when an amount that the waste liquid tank can accommodate is low, the recovery process is not executed, and the discharge performance of the discharge head cannot be restored.

Embodiments of the present invention provide technologies for executing a recovery process in accordance with the current amount that the waste liquid tank can accommodate.

Hereafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and a redundant description thereof is omitted.

Note that, in this specification, "print" encompasses forming not only meaningful information such as characters and shapes, but also, meaningless information. Furthermore, it broadly includes the formation of images, figures, patterns, and the like, on a print medium, or the processing of the medium, regardless of whether they are so visualized as to be visually perceivable by humans.

Also, "print medium" broadly encompasses not only paper used in a typical printing apparatus, but also, things that can receive ink such as cloths, plastic films, metal plates, glass, ceramics, wood materials, hides, or the like.

Furthermore, similar to the foregoing definition of "print", "ink" (also referred to as "liquid") should be broadly interpreted. Accordingly, "ink" encompasses liquids that by being applied to a print medium can be supplied in the forming of images, patterns, or the like, processing of print mediums, or processing of ink (for example, insolubilization or freezing of a colorant in ink applied to a print medium).

Furthermore, "nozzle", unless specified otherwise, encompasses a discharge port and an element that produces energy that is used for discharge of ink and a fluid channel that communicates therewith collectively.

First Embodiment

<Outline of Inkjet Printing Apparatus (FIG. 1)>

FIG. 1 is a perspective view illustrating an internal configuration of an inkjet printing apparatus 1 (hereafter, also referred to as printing apparatus 1) according to an embodiment. The printing apparatus 1 includes a print head 4 that discharges ink droplets as a liquid, and a carriage 3 that is equipped with the print head 4, and can move back and forth in a scanning direction.

The print head 4 of the present embodiment is an inkjet type print head that discharges ink using thermal energy, and includes a plurality of electrothermal converters for generating thermal energy. More specifically, thermal energy is generated by pulse signals applied to the electrothermal converters, film boiling is caused inside the ink liquid by thermal energy, and ink is discharged from discharge ports using bubbling pressure of film boiling, thereby performing printing. However, as the configuration of the print head 4, other well-known techniques can be appropriately employed.

In addition, the printing apparatus 1 includes, as a liquid supply mechanism to the print head 4, a liquid container 11 (supply tank) containing ink to be supplied to the print head 4, and a supply tube 8 serving as a path formation member that connects the liquid container 11 and the print head 4 and forms an ink supply path.

<Supply Mechanism (FIG. 2)>

Figure 2:
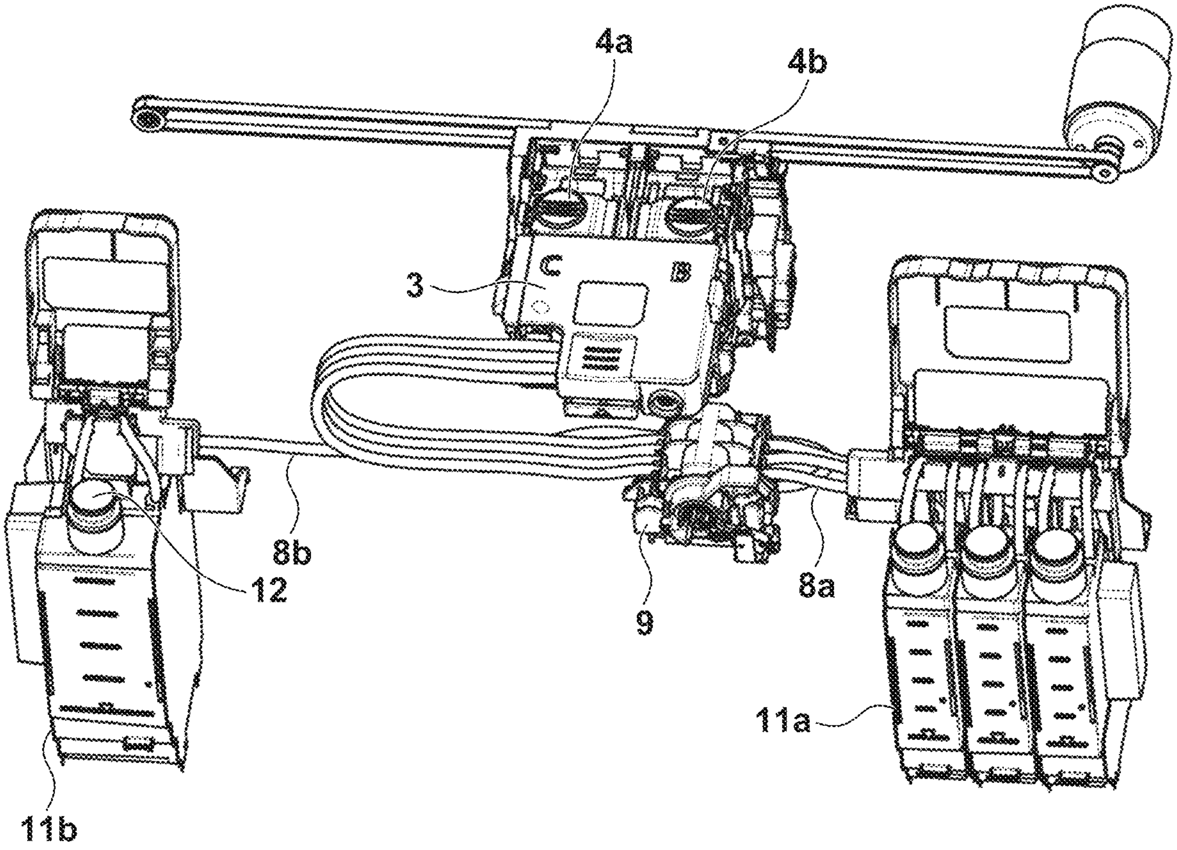
FIG. 2 is a detailed explanatory view illustrating a supply mechanism of the inkjet printing apparatus of FIG. 1.

FIG. 2 is a detailed view illustrating a supply mechanism of the printing apparatus 1 of FIG. 1. In this embodiment, the printing apparatus 1 includes, as the liquid container 11, a liquid container 11*a* for color ink and a liquid container 11*b* for black ink. In addition, the printing apparatus 1 includes, as the supply tube 8, a supply tube 8*a* which forms a supply path of color ink, and a supply tube 8*b* which forms a supply path of black ink. The printing apparatus 1 also includes a tube valve 9. The supply tubes 8*a* and 8*b* are configured to be capable of being closed by a user manually moving the tube valve 9. In other words, the tube valve 9 can switch between a state in which liquid can be supplied from the liquid containers 11*a* and 11*b* to the print head 4 and a state in which liquid cannot be supplied from the liquid containers 11*a* and 11*b* to the print head 4.

<Recovery Mechanism (FIGS. 3 and 4)>

Figure 3:
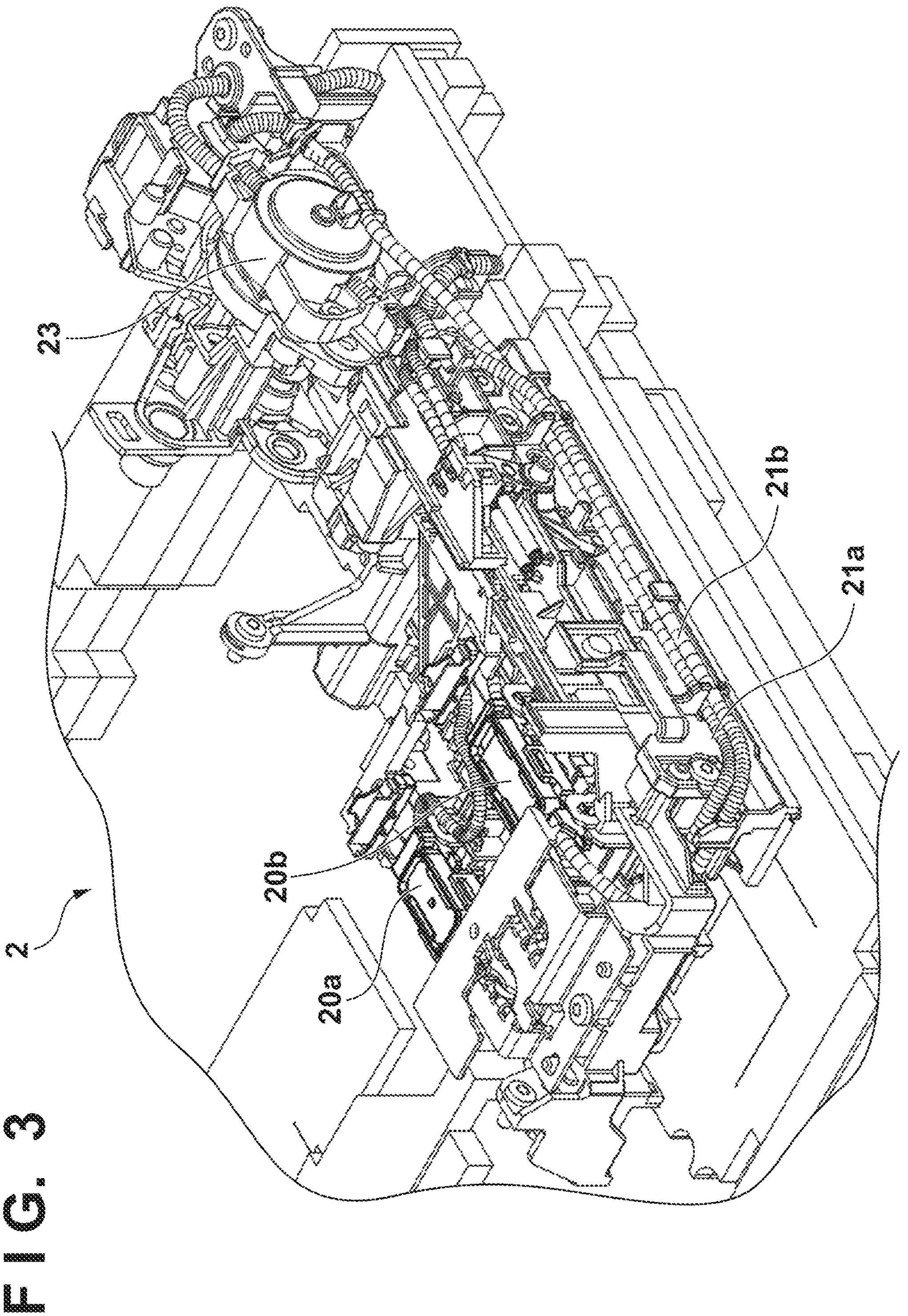
FIG. 3 is a perspective view of a recovery mechanism of the inkjet printing apparatus of FIG. 1.
Figure 4:
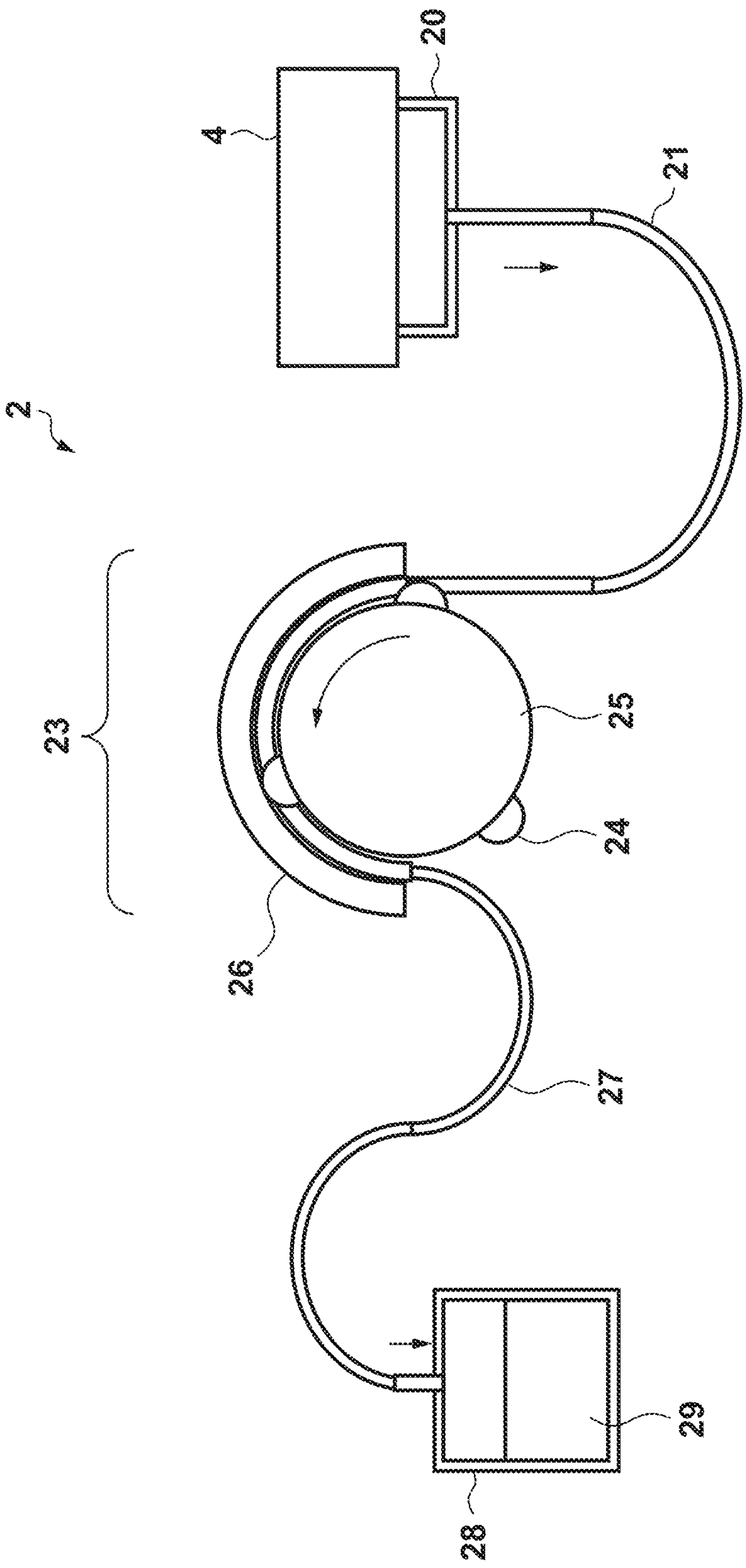
FIG. 4 is a view illustrating an example of a configuration of the recovery mechanism.

FIG. 3 is a perspective view of a recovery mechanism 2 of the printing apparatus 1 of FIG. 1. Also, FIG. 4 is a view illustrating an example of a configuration of the recovery mechanism 2. The printing apparatus 1 includes the recovery mechanism 2 that restores the discharge performance of the print head 4. In the present embodiment, the recovery mechanism 2 performs a recovery process of suctioning ink from the print head 4, and discharges the suctioned liquid to a waste ink tank 28 as a waste liquid tank. The recovery mechanism 2 includes a cap 20, a suction tube 21, and a suction pump 23.

Figure 5:
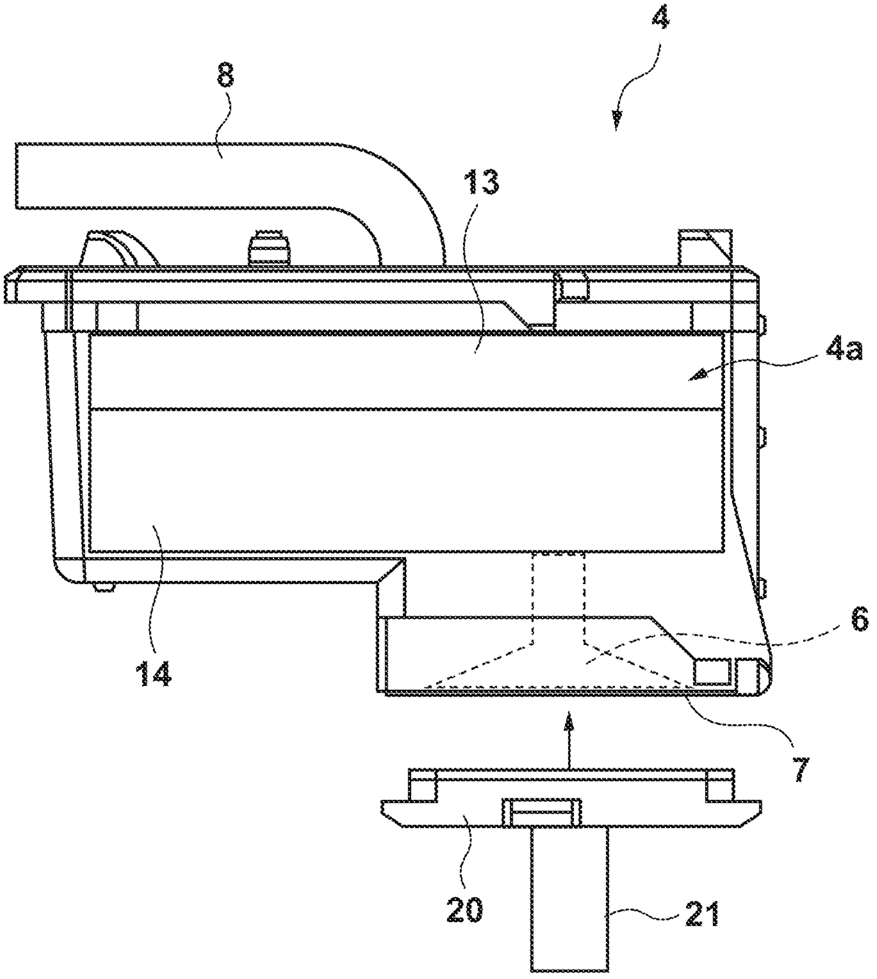
FIG. 5 is a schematic diagram illustrating an example of a configuration of a print head.

The cap 20 covers a nozzle 7 of the print head 4 (refer to FIG. 5 and the like). The cap 20, for example, prevents solvent evaporation from the nozzle 7 and adhesion of foreign matter when printing by the print head 4 is not performed or receives ink discharged from the nozzle 7 at the time of a recovery process described later. The cap 20 is connected to the suction pump 23 via the suction tube 21. Note that, in FIG. 3, as the cap 20, a CL cap 20*a* that covers the nozzle 7 that discharges color ink and a BK cap 20*b* that covers the nozzle 7 that discharges black ink are illustrated. In FIG. 3, a suction tube 21*a* connected to the CL cap 20*a* and a suction tube 21*b* connected to the BK cap 20*b* are illustrated as the suction tube 21.

The suction pump 23 suctions ink from the nozzle 7 via the cap 20. In the present embodiment, the suction pump 23 includes a shaft member 25, rollers 24 provided so as to protrude from the outer peripheral portion of the shaft member 25, and a guide 26 having a shape along the shaft member 25. The shaft member 25 and the guide 26 are provided so as to support a part of the suction tube 21 therebetween.

When the shaft member 25 is rotated in the direction of the arrow by a purge motor 4009 to be described later, the rollers 24, in a region where the guide 26 is provided along the shaft member 25, rotate while sequentially squashing the suction tube 21. By rotating the suction pump 23, while the discharge surface on which the nozzle 7 of the print head 4 is provided, is sealed with the cap 20, the inside of the suction tube 21 can be reduced in pressure. As a result, ink can be suctioned from the nozzle 7.

The ink suction amount by the suction pump 23 can be controlled by the number of rotations, the rotation speed, and the like, of the rollers 24. The ink discharged from the suction pump 23 is accommodated in the waste ink tank 28 via a waste ink tube 27. A waste ink absorber 29 is provided in the waste ink tank 28. Since the waste ink is absorbed by the waste ink absorber 29, it is possible to prevent the leakage of waste ink from the waste ink tank 28 when the printing apparatus 1 tilts, or the like. Note that, in the present embodiment, the waste ink tank 28 is incorporated in the main body of the printing apparatus 1, and is described as a configuration that cannot be replaced by the user. However, as indicated in the second and third embodiments, the waste ink tank 28 may be configured to be capable of being attached/detached from the main body of the printing apparatus 1, and may be replaceable by a user.

<Print Head (FIG. 5)>

FIG. 5 is a schematic diagram illustrating an example of a configuration of the print head 4. A supply tube 8 is connected to the upper portion of the print head 4, and ink is supplied from a liquid container 11 to the print head 4. A head absorber 14 is provided in an inner space 4*a* of the print head 4. The head absorber 14 is a member that absorbs/retains ink in order to keep the ink in the print head 4. Further, in the upper portion of the head absorber 14 of the inner space 4*a*, there is an air layer 13. Further, a liquid chamber 6 is provided on below the head absorber 14, and the nozzle 7 is provided on the lower portion of the liquid chamber 6. The above-mentioned cap 20 can cover the nozzle 7 from below.

<Example of Hardware Configuration (FIG. 6)>

Figure 6:
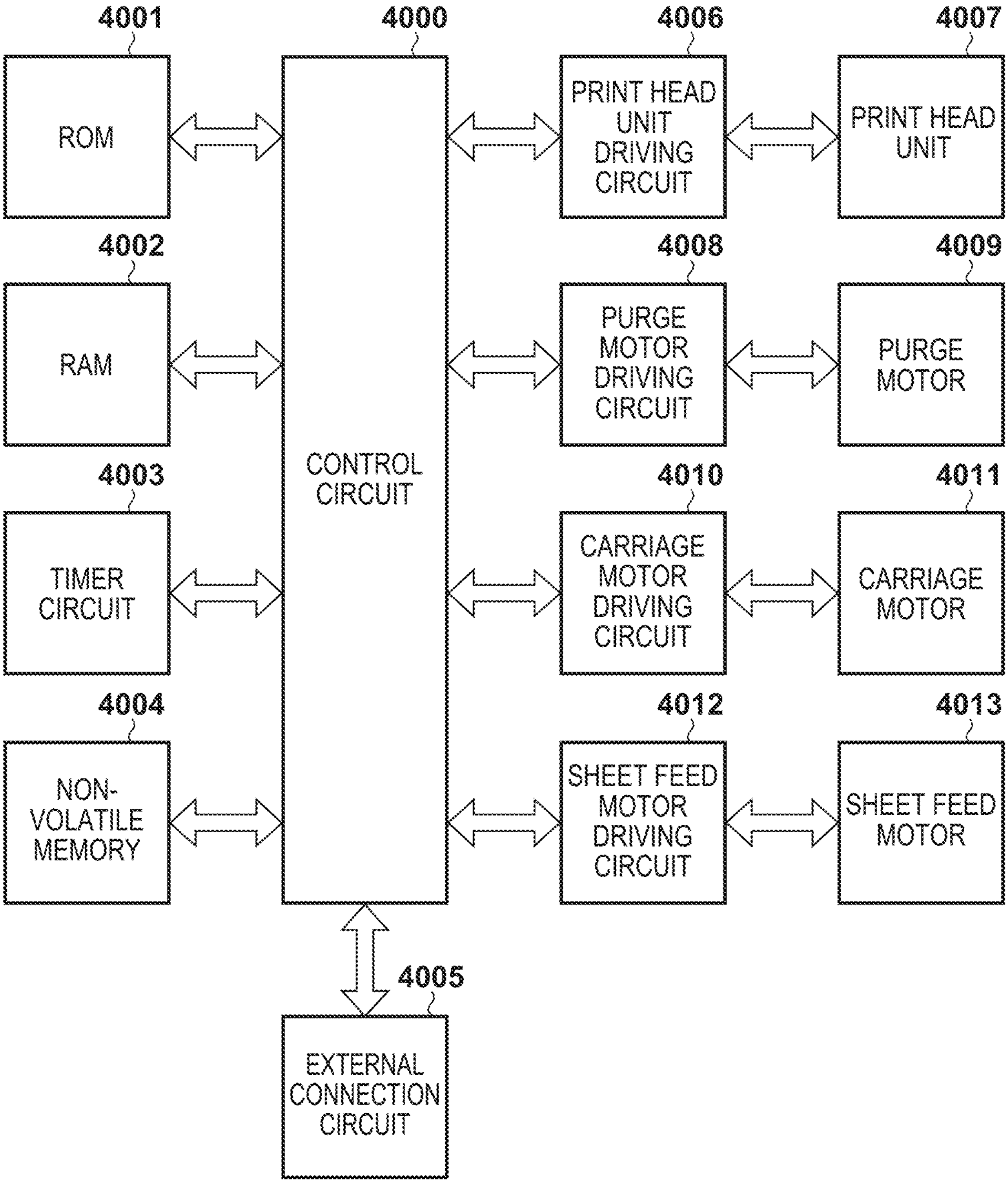
FIG. 6 is a block diagram illustrating an example of a hardware configuration of a printing apparatus.

FIG. 6 is a block diagram illustrating an example of a hardware configuration of the printing apparatus 1.

A control circuit 4000 collectively controls the printing apparatus 1. The control circuit 4000 is, for example, a processor typified by a CPU, and executes a control program stored in a ROM 4001 by deploying it in a RAM 4002. Each flowchart described below indicates a portion of a sequence executed by the control program.

The ROM 4001 stores respective set values in the control program and control that the control circuit 4000 executes. The RAM 4002 performs deployment of control programs that the control circuit 4000 executes, storage of print data and control commands, and storage of control variables in each instance of control. A timer circuit 4003 is a circuit capable of acquiring the current time, or a circuit capable of measuring an elapsed time. A non-volatile memory 4004 is a memory capable of remembering parameters stored by control even in a state in which the power of the main body is turned off, and, for example, writing, reading, and the like, of a time serving as a starting point at the time of calculating an elapsed time in a control described later are performed.

An external connection circuit 4005 is a circuit that relays the transmission/reception of control signals between the control circuit 4000 and an external host device, or the like, as an interface at the time of performing communication between the printing apparatus 1 and an external host device, or the like, in a wired or wireless manner. For example, data of an image to be printed is inputted from an external unit to the printing apparatus 1 via the external connection circuit 4005. Further, the current time may be inputted to the printing apparatus 1 via the external connection circuit 4005.

When the printing apparatus 1 prints an image on a print medium, the control circuit 4000 extracts the image data received by the external connection circuit 4005 in the RAM 4002. Then, the control circuit 4000 controls the driving of a print head unit 4007 via a print head unit driving circuit 4006 based on the data on the RAM 4002, and simultaneously controls a carriage motor 4011 via a carriage motor driving circuit 4010. By ink being discharged to a desired position of the print medium in accordance with control by the control circuit 4000, a single print scan is executed. Also, the control circuit 4000 controls a sheet feed motor 4013 via a sheet feed motor driving circuit 4012 to convey the print medium by a predetermined amount. The printing apparatus 1 repeats the print scan and the conveyance of the print medium, thereby executing the printing of an image over the conveyance direction of the print medium.

Also, the preliminary discharge, which will be described later, is executed by the control circuit 4000 controlling the driving of the print head unit 4007 via the print head unit driving circuit 4006. In this instance, the pattern for driving the print head 4 may be based on any of data extracted on the RAM 4002, data of the ROM 4001, or data generated by the control circuit, as in the case of a printing operation.

Further, a purge motor driving circuit 4008 is a circuit for driving the purge motor 4009 for rotating the suction pump 23. For example, when a recovery flag is set and that information is stored in the non-volatile memory 4004, by the control circuit 4000 driving the purge motor 4009 via the purge motor driving circuit 4008, a recovery process to be described later is executed.

<Recovery Process of Print Head>

Here, a recovery process of the print head 4 will be described. The printing apparatus 1 can execute a recovery process for recovering the discharge performance of the print head 4. Moreover, the printing apparatus 1 can execute a plurality of recovery processes, in which the discharge amounts of waste ink are different, in accordance with the state of the apparatus or the like. In the present embodiment, the printing apparatus 1 can execute cleaning and system cleaning as recovery processes with different discharge amounts.

The cleaning is a recovery process in which the discharge amount of waste ink is less compared with system cleaning. For example, the cleaning includes so-called preliminary discharge. The preliminary discharge can be executed for the purpose of discharging thickened ink and dust in the ink discharge port of the print head by ink discharge to maintain/restore the discharge performance of the print head 4, and the like. Further, for example, the cleaning includes wiping of the discharge surface of the print head 4. The cleaning may be executed before the print process of an image is executed or during the execution of the print process. Also, the cleaning may be executed based on an instruction from the user, or may be executed at a predetermined cycle shorter than the system cleaning described later. Note that the printing apparatus 1 may be capable of executing, as the cleaning, a plurality of types of processes with different amounts of waste ink.

The system cleaning is a recovery process in which the discharge amount of waste ink is greater compared with the cleaning. In the present embodiment, the system cleaning includes a suction operation of ink of the print head 4 by the suction pump 23. For example, the system cleaning can be executed based on a user instruction when the degree of deterioration of the discharge performance of the print head 4 is relatively great, or when the discharge performance of the print head 4 is not sufficiently restored by the above-described cleaning. Also, for example, the system cleaning may be executed at a predetermined cycle longer than the cleaning, such as once every one to two years.

The system cleaning may be executed for the purpose of removing air bubbles in the print head 4, discharging solidified ink, filling ink, and the like. For example, air bubbles in the print head 4 are generated as follows. Air bubbles are generated on the inner wall of the supply tube 8, and when the printing operation is executed, the air bubbles gradually flow into the print head 4. When the air bubbles flow into the print head 4, the amount of ink filled in the head absorber 14 gradually decreases, resulting in discharge failure of the print head 4. In such a discharge failure, since it is necessary to sufficiently fill the head absorber 14 with ink, the system cleaning, which includes an operation of suctioning ink in the print head 4 from the discharge surface side by the suction pump 23, becomes necessary.

Incidentally, in the system cleaning, the discharge amount of the waste ink becomes great since the ink in the print head 4 is forcibly discharged by the suction pump 23, and there are cases when, if the current amount of waste ink that the waste ink tank 28 can accommodate is low, the system cleaning cannot be executed. On the other hand, there are cases when if the system cleaning cannot be executed, it becomes impossible to continue the printing operation. Therefore, in the present embodiment, as will be described later, the system cleaning is executed in accordance with the amount of waste ink that the waste ink tank 28 can accommodate (refer to system cleaning SC1 and SC2 in FIG. 9).

Note that the system cleaning may include, as an operation thereof, preliminary discharge, or the like, in addition to the ink suction operation of the print head 4 by the suction pump 23. For example, in the system cleaning, operations such as preliminary discharge and wiping may be executed after the ink suction operation of the print head 4 by the suction pump 23.

<Description of Operation of System Cleaning (FIGS. 7 to 8)>

Figure 7:
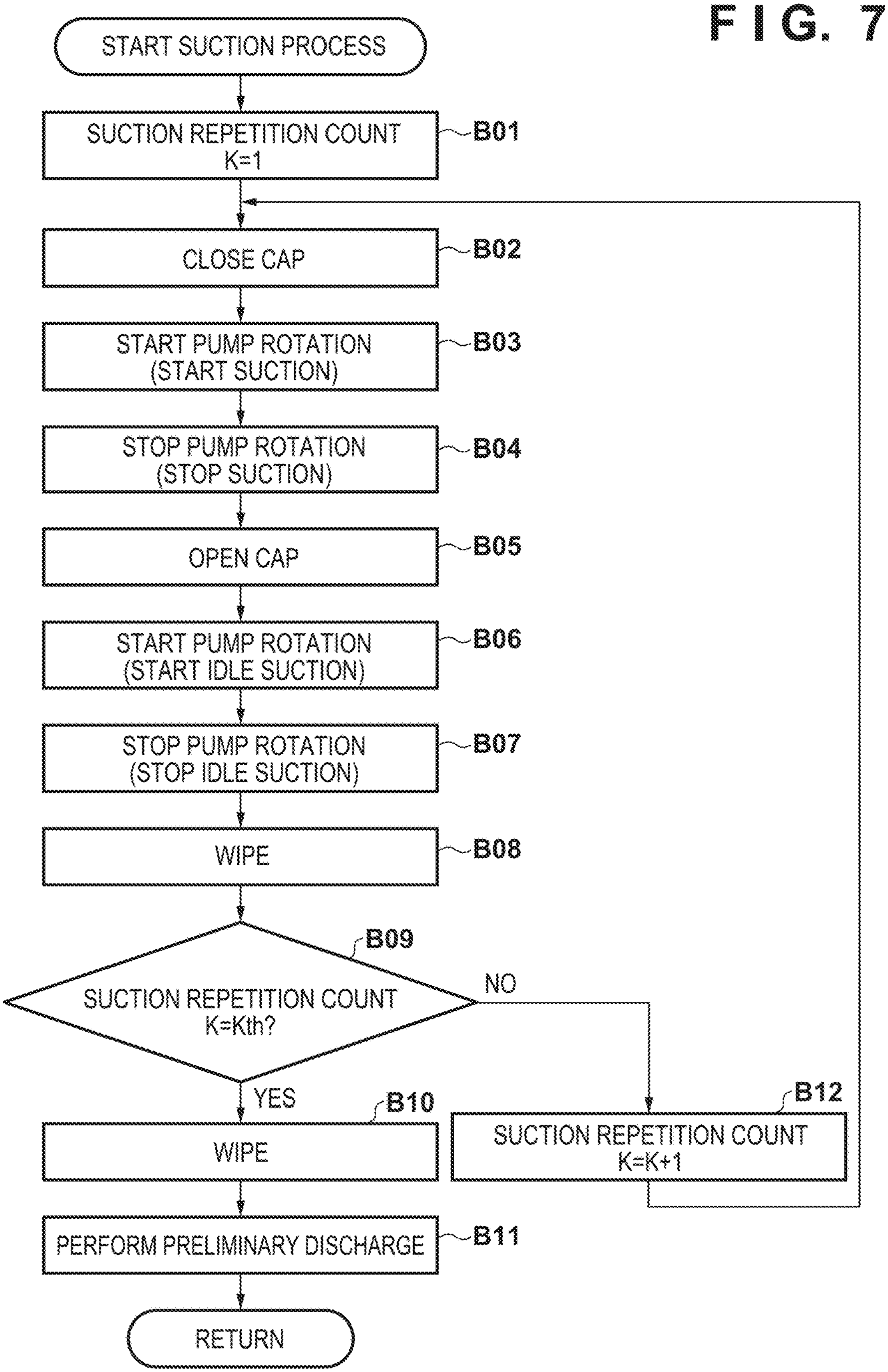
FIG. 7 is a flowchart illustrating a process of suction of ink in the print head by the recovery mechanism.

FIG. 7 is a flowchart illustrating a process of suction of ink in the print head 4 by the recovery mechanism 2. The present flowchart indicates, for example, a specific example of the process of steps C01 and C02 of FIG. 8. That is, this flowchart indicates a part of the process of the system cleaning.

In step B01 (hereafter, simply referred to as B01, the same applies to other steps), the control circuit 4000 sets a suction repetition count K to K=1. In B02, the control circuit 4000 moves the cap 20 so as to be in close contact with plane where the nozzle 7 of the print head 4 is disposed (close the cap).

In B03, the control circuit 4000 drives the purge motor 4009 by the purge motor driving circuit 4008 and starts rotation of the suction pump 23. That is, suction by the suction pump 23 starts. After the suction pump 23 has rotated a predetermined number of rotations, the control circuit 4000, in B04, ends the driving of the purge motor 4009 by the purge motor driving circuit 4008 and ends the rotation of the suction pump 23. That is, suction by the suction pump 23 ends. In B05, the cap 20 is separated from the print head 4 (open the cap). Thus, the inside of the print head 4 is released to the atmospheric pressure.

In B06, the control circuit 4000 drives the purge motor 4009 by the purge motor driving circuit 4008, rotates the suction pump 23, and starts idle suction for suctioning ink from the cap 20 without suctioning ink from the nozzle 7. By the suction pump 23 being rotated while the cap 20 is opened to the atmosphere, the ink remaining in the cap 20 is suctioned and discharged to the waste ink tank 28. After the suction pump 23 has rotated a predetermined number of rotations, the control circuit 4000, in B07, ends the driving of the purge motor 4009 by the purge motor driving circuit 4008, ends the rotation of the suction pump 23, and stops the idle suction.

Thereafter, in B08, the control circuit 4000 implements wiping of the discharge surface of the print head 4 using a wiper (not illustrated).

In B09, the control circuit 4000 confirms whether or not the suction repetition count K=a threshold value Kth, and proceeds to B10 when the suction repetition count K=the threshold value Kth, and proceeds to B12 when it is not the suction repetition count K=the threshold value Kth.

In B10, the control circuit 4000 performs wiping of the discharge surface of the print head 4 using a wiper (not illustrated). In B11, the control circuit 4000 implements preliminary discharge of the print head 4 and ends this flowchart.

On the other hand, if the process proceeds to NO at the branch of B09, the control circuit 4000, in B12, adds 1 to the repetition count K (K=K+1), returns to B02, and repeats the process.

Note that, in the present embodiment, the opening of the inside of the cap 20 to the atmospheric pressure was performed by separating the cap from the print head 4, but may be implemented by opening an air release valve provided in the cap 20.

Figure 8:
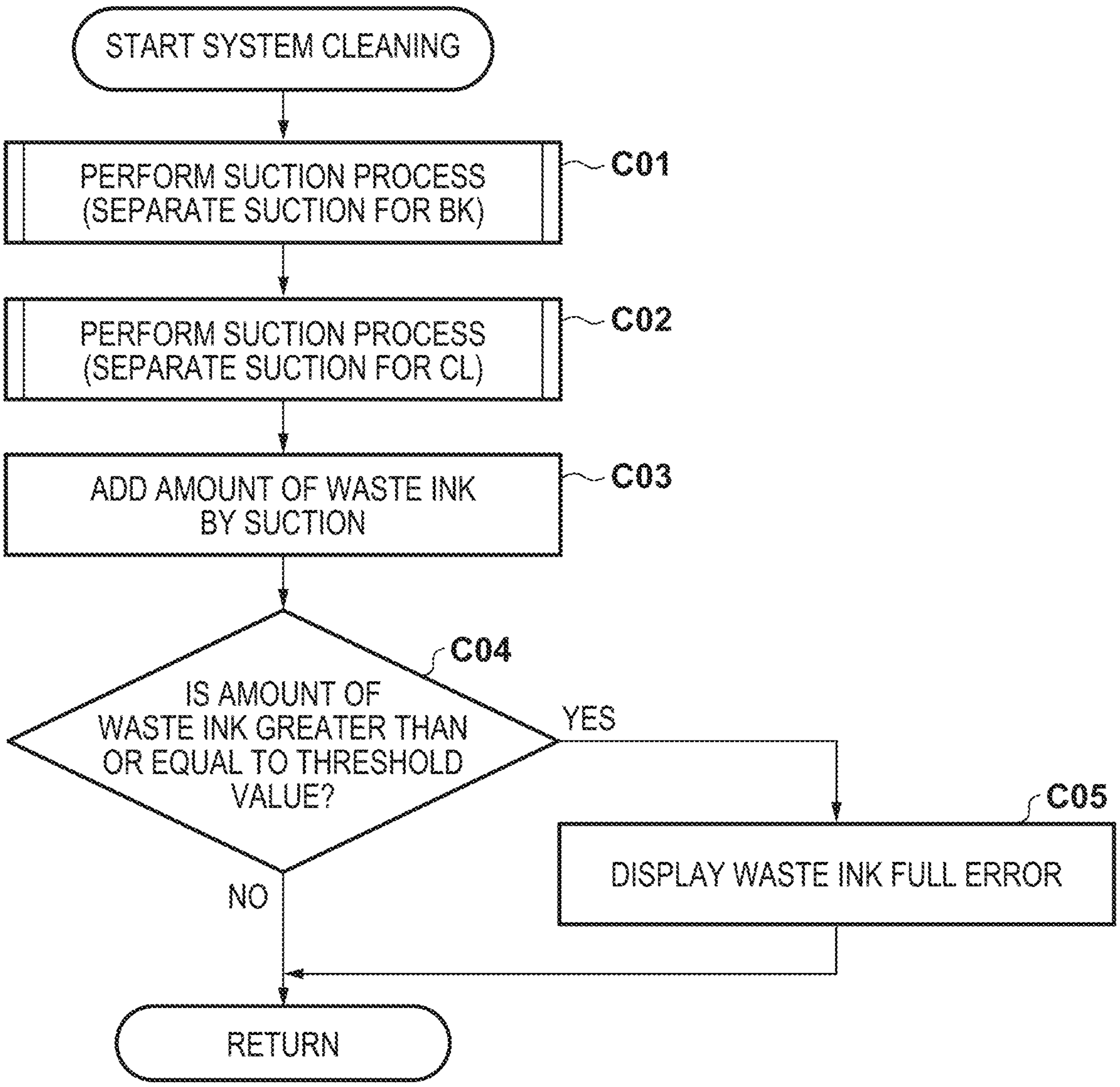
FIG. 8 is a flowchart illustrating a sequence of system cleaning.

FIG. 8 is a flowchart illustrating a sequence of the system cleaning. The present flowchart indicates, for example, a specific example of the process of S07 of a flowchart of FIG. 14.

In C01, the control circuit 4000 implements a suction operation (separate suction for BK). For example, the control circuit 4000 implements the sequence illustrated in FIG. 7 for the nozzle 7 of the print head 4 that discharges black ink using the BK cap 20*b* for black ink and the suction tube 21*b*.

In C02, the control circuit 4000 implements a suction operation (separated suction for CL). For example, the control circuit 4000 implements the sequence illustrated in FIG. 7 for the nozzle 7 of the print head 4 that discharges color ink using the CL cap 20*a* for color ink and the suction tube 21*a*. Note that, for C01 and C02, whether to perform separate or simultaneous suction of black ink and color ink can be set as appropriate.

In C03, the control circuit 4000 implements addition of the amount of waste ink by the suction operations of C01 and C02. Thereafter, in C04, the control circuit 4000 confirms whether or not the cumulative amount of waste ink is equal to or greater than a predetermined threshold value, and proceeds to C05 when the cumulative amount of waste ink is equal to or greater than the threshold value, and ends the flowchart when the cumulative amount of waste ink is less than the threshold value. That is, in C04, by comparison of the cumulative amount of waste ink and the capacity of the waste ink tank 28, it is determined whether or not the waste ink tank 28 is full. In C05, the control circuit 4000 displays a waste ink full error on a display unit (not illustrated) or the like and ends the flowchart. For example, when the waste ink full error is displayed, the printing operation of the printing apparatus 1 may be prohibited. In addition, when the cumulative amount of waste ink is compared in C04, if the amount exceeds the capacity of 90% of the waste ink tank 28, a warning may be notified to the user in C05 that the replacement timing of the waste ink tank 28 is close.

<Relationship between Suction Parameters and Ink Filling Ratio (FIGS. 9 to 13)>

FIG. 9 is a view illustrating suction parameters for the system cleaning. In the present embodiment, the printing apparatus 1 can execute two types of system cleaning SC1 and SC2 according to the amount of waste liquid that the waste ink tank 28 can accommodate. Below, the system cleaning SC1 and SC2 may be simply referred to as SC1 and SC2, respectively.

In SC2, the driving speed is Y1, the driving amount is X2, and the number of times of driving is one at the time of separate suction for BK, and the driving speed is Y1, the driving amount is X4 (>X2), and the number of times of driving is once at the time of separate suction for CL. Here, in the present embodiment, the driving speed is the number of rotations of the suction pump 23 per unit time, the driving amount is the amount of rotation of the suction pump per system cleaning.

On the other hand, in SC1, the driving speed Y1 and the number of times of driving 1× of the separate suction for BK are the same as SC2, but the driving amount X1 is at a lesser value than the driving amount X2. In the present embodiment, the driving amount X1=(½)*X2. Also, in SC1, the driving speed Y1 and the number of times of driving 1× of the separate suction for CL are the same as SC2, but the driving amount X3 is at a lesser value than the driving amount X4. In the present embodiment, the driving amount X3=(½)*X4.

That is, between SC1 and SC2, the driving speed of the suction pump 23 and the number of times of driving are not changed, and the driving amount of the suction pump 23 is changed. As a result, between SC1 and SC2, the amount of waste ink at the time of execution is changed. In other words, between SC1 and SC2, the amount of ink suctioned from the print head 4 by the suction pump 23 is changed by changing the driving amount of the suction pump 23. Note that, it can be said that the greater the ink suction amount, the higher the recovery strength in the recovery process, and, therefore, it can be said that between SC1 and SC2, the recovery strength is changed.

FIG. 10 is a view illustrating waste ink tank usage ratios of system cleaning. When a waste ink full error threshold value is set to a 100% usage ratio, the amount of waste ink of SC2 is 50% and the amount of waste ink of SC1 is 25%. That is, in the present embodiment, waste ink of one half of the total amount that the waste ink tank 28 can accommodate is discharged in SC2, and waste ink of one quarter of the total amount that the waste ink tank 28 can accommodate is discharged in SC1. Incidentally, FIG. 10 illustrates the amount of unevaporated waste ink in which evaporation of waste ink is not taken into consideration.

Figure 11:
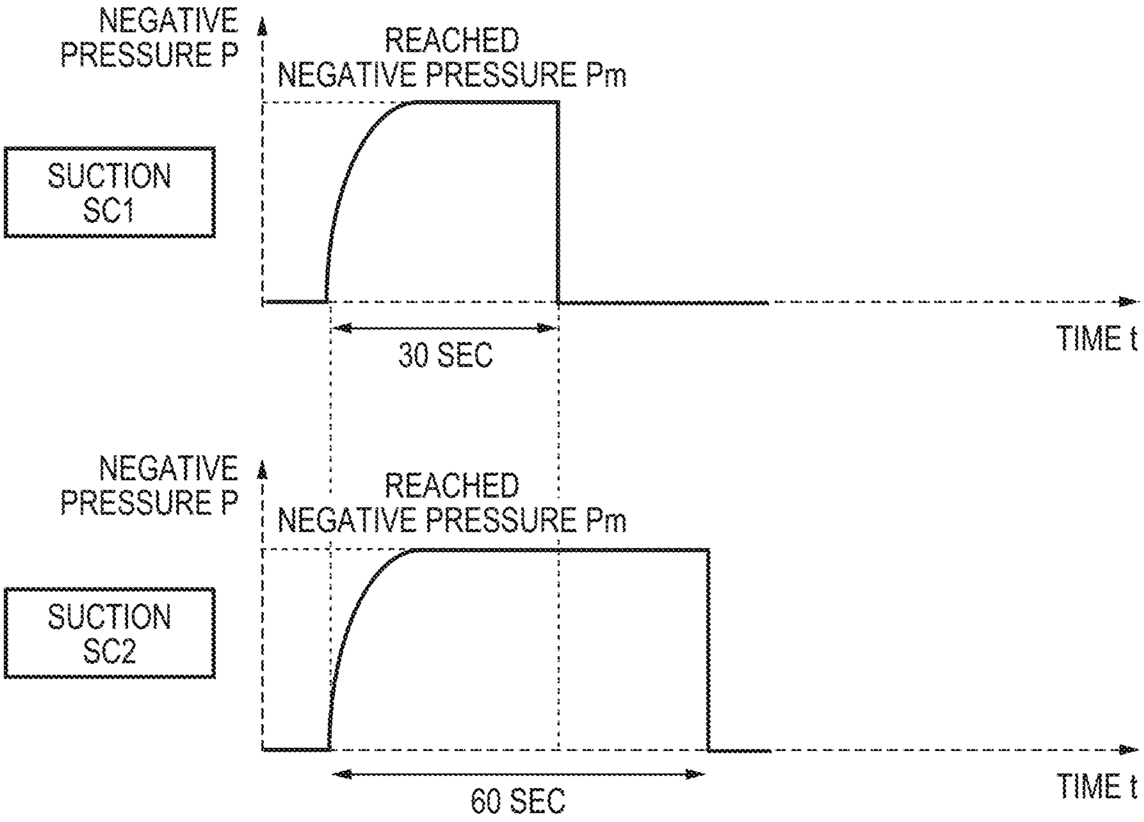
FIG. 11 is a schematic diagram of negative pressure profiles of system cleaning.

FIG. 11 is a schematic diagram of negative pressure profiles of the system cleaning. In SC1 and SC2, since the number of times of driving in each of the separate suction for BK/the separate suction for CL is once, a negative pressure P in the cap 20 has a negative pressure wave form of a single peak in both the separate suction for BK/the separate suction for CL. In addition, since the driving speeds of SC1 and SC2 are the same (Y1), the negative pressures reached are the same. On the other hand, since SC1 is less than SC2 in driving amount of the suction pump 23, the driving time of the suction pump 23 is shortened. In this embodiment, regarding SC1, the driving amount is half of SC2 (X1=(½)*X2), and since the driving speed Y1 is the same as SC2, the driving time becomes half of SC2.

Figures 12, 13:
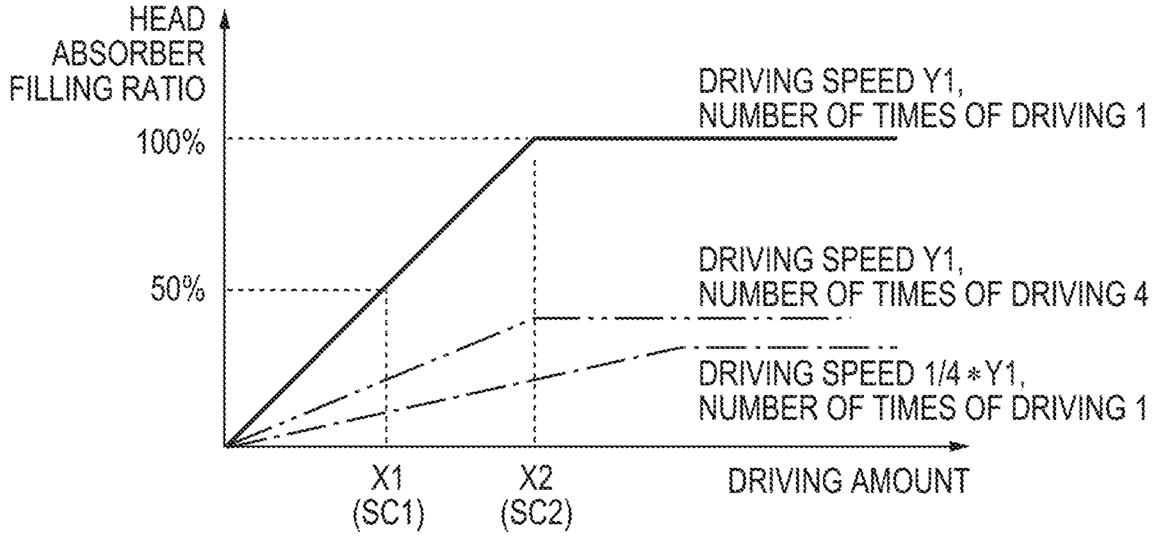
FIG. 12 is a schematic diagram illustrating the relationship between a driving amount of a suction pump and a filling ratio of an absorber of the print head.
FIG. 13 is a view illustrating the relationship between the filling ratio of the print head and a period until the next system cleaning.

FIG. 12 is a schematic diagram illustrating the relationship (filling efficiency) between the driving amount of the suction pump 23 of the system cleaning and the filling ratio of the absorber of the print head. When the driving amount of the suction pump 23 is increased, more ink can be supplied from the liquid container 11 to the print head 4, and the filling ratio of the absorber of the print head 4 increases. Here, in SC2, since at the driving speed Y1, the driving amount X2 is set to a point where the filling ratio is saturated, the filling ratio is 100%. On the other hand, in SC1, since the driving amount is reduced to half with respect to SC2, the filling ratio is lowered to 50%.

The filling efficiency of the system cleaning also varies according to the driving speed of the suction pump 23 and the number of times of driving. For example, when the driving speed Y1 is maintained and the number of times of driving of the suction pump 23 is increased from one to four times, the suction in terms of a negative pressure wave shape will have four peaks. However, since the negative pressure is reset for each suction, the filling efficiency deteriorates. Further, if the driving speed is reduced from Y1 to, for example (¼)*Y1, since the negative pressure P that the suction pump 23 reaches is lowered, the filling efficiency is deteriorated. Therefore, in order to increase the filling efficiency of the print head 4, it is conceivable to increase the driving speed of the system cleaning and reduce the number of times of driving.

FIG. 13 is a view illustrating the relationship between the filling ratio of the print head and a period until the next system cleaning. The filling ratio of SC2 is 100% and the period until the next system cleaning becomes necessary is two years. On the other hand, the filling ratio of SC1 is 50% and the period until the next system cleaning becomes necessary is shortened to one year. Therefore, in order to reduce the frequency with which the user implements system cleaning, it is conceivable to execute a parameter with an increased filling ratio, which, in this embodiment, is SC2. On the other hand, when the remaining amount that the waste ink tank 28 can accommodate is low, a large amount of ink cannot be discharged to the waste ink tank 28, and, therefore, it is conceivable to execute SC1 whose amount of waste ink is less. Incidentally, since the period until the next system cleaning described above varies depending on the temperature and the humidity of the environment in which the printing apparatus 1 is installed, the usage frequency of the printing apparatus, and the like, it is a numerical example assumed with an average usage condition.

<Processing Example of Recovery Process (FIGS. 14 to 16)>

Figure 14:
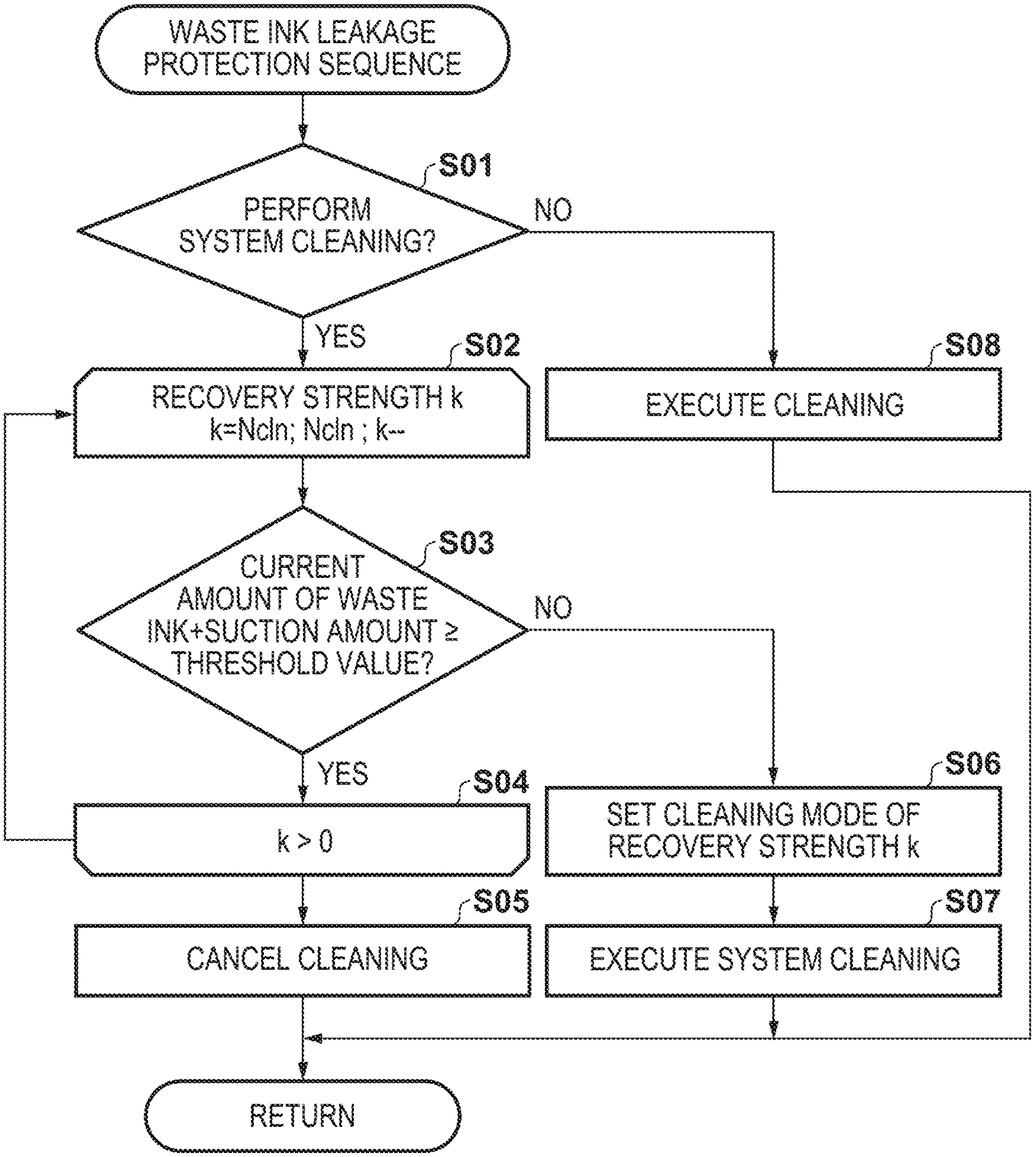
FIG. 14 is a flowchart illustrating a sequence of a recovery process.

FIG. 14 is a flowchart illustrating a sequence of a recovery process. The printing apparatus 1 selects and executes the content of operation of the recovery process according to this flowchart. This flowchart begins, for example, when a recovery flag is set in the non-volatile memory 4004. The recovery flag may be set, for example, according to input by the user, the period elapsed since the previous recovery process, the status of the apparatus, and the like. As examples of the setting according to the status of the apparatus, a case when it is left in a cap open state after an abnormal termination, a case when the liquid container 11 was replaced, a case when the amount of ink droplet (the number of dots) taken for the printing operation from the previous recovery process reaches a predetermined value or more, and the like, are given.

In S01, the control circuit 4000 checks whether the recovery flag is the system cleaning. If it is not the system cleaning, that is, if it is the cleaning flag, the process proceeds to S08, and the set cleaning is implemented. As examples of operation of cleaning, preliminary discharge, wiping, and the like are given. If the system cleaning flag is set in S01, the process advances to S02. As cases when the flag of the system cleaning is set as the recovery flag, a case when an input is made by the user, a case when a long period of time, for example, one to two years have elapsed since the previous system cleaning, and the like, are given.

In S02, the control circuit 4000 sets the recovery strength k to Ncln (2 in the present embodiment). In S03, the control circuit 4000 adds the suction amount of the system cleaning to the current amount of waste ink, and confirms whether that is equal to or greater than the waste ink full error threshold value. That is, it is confirmed whether or not (the current amount of waste ink+ the suction amount)≥the threshold value. More specifically, when the recovery strength k is 2, it is checked whether (the current amount of waste ink+ the suction amount of SC2 (=the amount of waste ink))≥the threshold value. More specifically, when the recovery strength k is 1, it is checked whether (the current amount of waste ink+ the suction amount of SC1(=the amount of waste ink))≥the threshold value.

Note that the current amount of waste ink can be specified as follows. For example, the control circuit 4000 may count the droplet amount of ink when preliminary discharge or suction by the suction pump 23 were executed in previous recovery processes, or the like, and store the total value as the amount of waste ink in the non-volatile memory 4004, or the like. Then, the amount of waste ink may be specified by reading the value stored in the non-volatile memory 4004 in the process of S03. Also, the control circuit 4000 may detect the amount of waste ink by a sensor, or the like, provided in the waste ink tank 28. As examples of the sensor, a sensor that optically detects a color change due to absorption of ink by the waste ink absorber 29, and the like, are given.

The control circuit 4000, if the amount is less than the threshold value in S03, proceeds to S06 and sets the system cleaning of the recovery strength k. For example, the control circuit 4000 sets the system cleaning SC2 when the recovery strength k is 2, and sets the system cleaning SC1 when the recovery strength k is 1. Thereafter, in S07, the control circuit 4000 executes the set system cleaning. On the other hand, the control circuit 4000, if the amount is the threshold value or more in S03, returns to S02 via S04 and reduces the recovery strength k, or proceeds to S05. For example, when the current recovery strength k is 2, the process returns to S02 and the recovery strength k is set to 1. On the other hand, when the current recovery strength k is 1, the process proceeds to S05. In S05, the control circuit 4000 cancels the cleaning.

In the above flowchart, the control circuit 4000 specifies a state relating to the amount that the waste ink tank 28 can accommodate in S02 and S03. Specifically, the control circuit 4000 identifies whether the amount that the waste ink tank 28 can accommodate is in a state in which SC1 or SC2 can be executed or is in a state in which neither SC1 nor SC2 can be executed. Then, in S06, the control circuit 4000 changes the amount of ink suctioned by the recovery mechanism 2 based on the identified state. As a result, the recovery process can be executed in accordance with the amount that the waste ink tank 28 can accommodate.

Further, according to the present embodiment, the control circuit 4000 specifies the current amount of waste ink (amount of waste liquid) of the waste ink tank 28 as a state related to the amount that the waste ink tank 28 can accommodate. Also, when the sum of the current amount of waste ink as a value based on the amount of waste ink and the amount of suction by the suction pump 23 is equal to or greater than the threshold value, the amount of suction by the suction pump 23 is made less than when the sum is less than the threshold value. More specifically, when the amount becomes equal to or greater than the threshold value in S03 when the recovery strength k is 2, SC2 with a less suction amount than SC1 may be executed. Therefore, even when the amount that the waste ink tank 28 can accommodate decreases, it is possible to execute the recovery process that accords with the amount that can be accommodated, and, thereby, it is possible to enable a continuous execution of the printing operation.

The effect of the present embodiment will be further described with reference to FIGS. 15 and 16.

Figure 15:
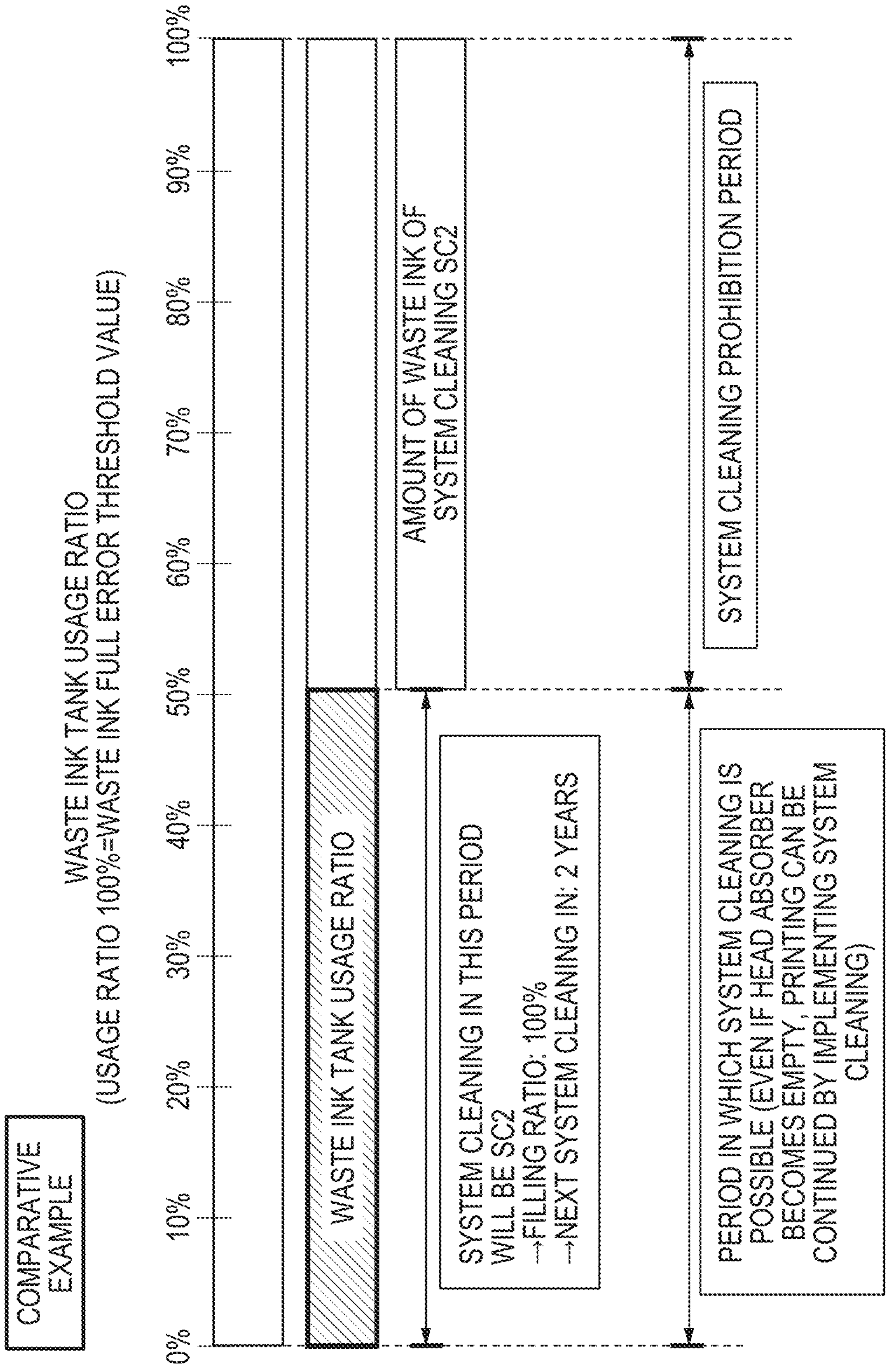
FIG. 15 is a schematic diagram illustrating a waste ink tank usage ratio of system cleaning of a comparative example.

FIG. 15 is a schematic diagram illustrating the waste ink tank usage ratio of the system cleaning when the system cleaning parameter is fixed to SC2 as a comparative example. Since the amount of waste ink in SC2 is 50% of the total amount that the waste ink tank 28 can accommodate, SC2 can be executed when the waste ink tank usage ratio is less than 50%. On the other hand, when the waste ink tank usage ratio is 50% or more, if SC2 is executed, the amount of waste ink will exceed the amount that the waste ink tank 28 can accommodate, and, therefore, SC2 cannot be executed. Therefore, the printing apparatus 1 cannot restore discharge failure, or the like, and will not be able to continue the printing operation.

Figure 16:
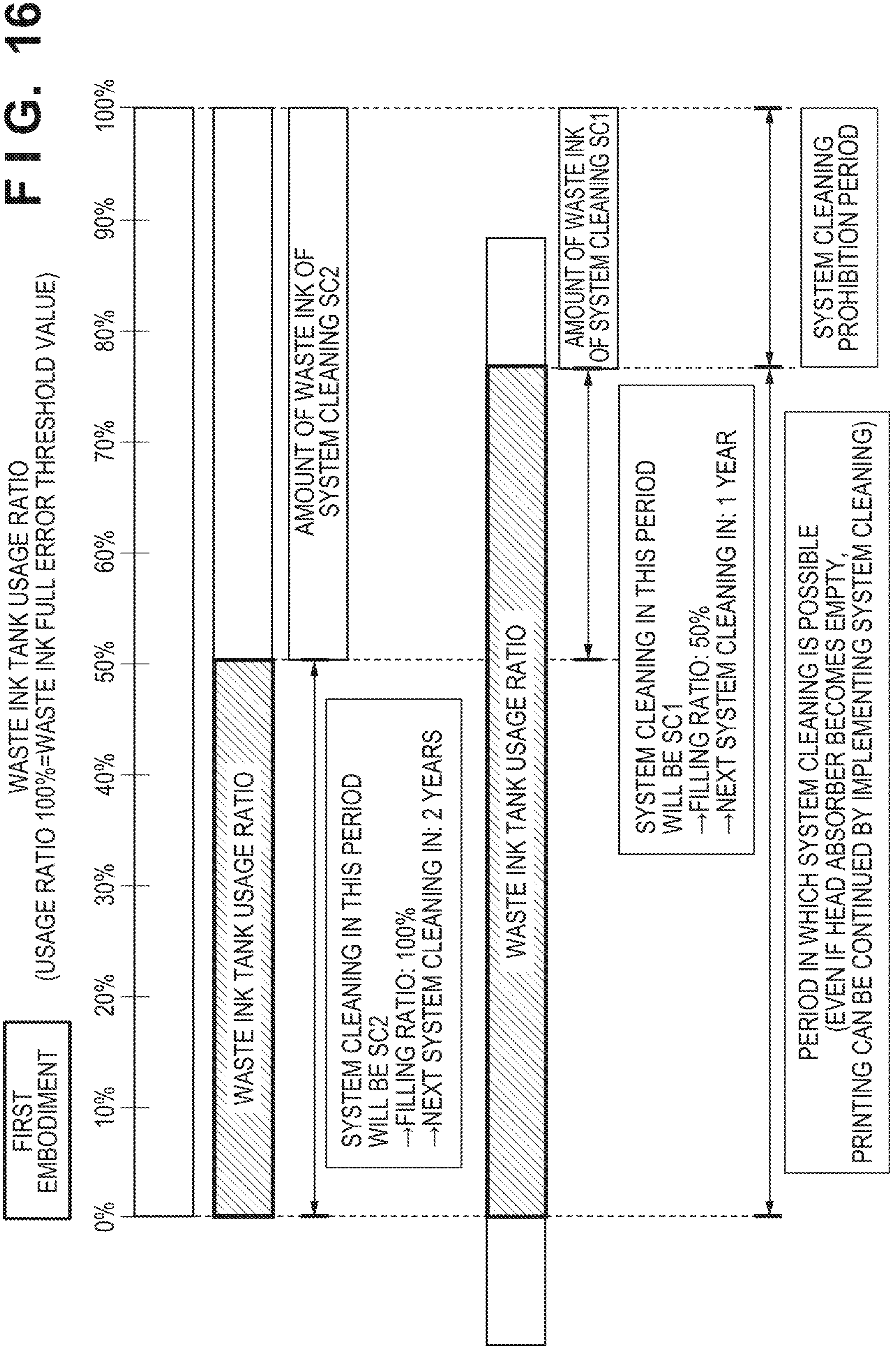
FIG. 16 is a schematic diagram illustrating waste ink tank usage ratios when system cleaning is executed using the sequence of FIG. 14.

FIG. 16 is a schematic diagram illustrating the waste ink tank usage ratio when system cleaning is executed using the sequence of FIG. 14. SC2 can be executed as in the comparative example until the waste ink tank usage ratio reaches 50%. Further, in the present embodiment, when the waste ink tank usage ratio is 50% or more and less than 75%, it is possible to execute SC1 in which the amount of waste ink is smaller than that of SC2. When the waste ink tank usage ratio is 75% or more, the system cleaning is prohibited. That is, in the comparative example, when the waste ink tank usage ratio exceeds 50%, the system cleaning cannot be executed, but, in the method of the present embodiment, when the waste ink tank usage ratio exceeds 50% but is less than 75%, the system cleaning can be executed. As described above, according to the present embodiment, when the amount of waste ink is equal to or more than the predetermined value, the minimum necessary amount of ink can be filled in the head absorber 14 of the print head 4 while reducing the amount of waste ink, and thereby, it becomes possible to continue the printing operation longer than in the comparative example. Further, compared with the comparative example, it becomes possible to accommodate more waste ink in the waste ink tank 28.

Note that, in this embodiment, it is confirmed in S03 whether or not (the current waste ink amount+the suction amount) exceeds the threshold value, but the setting of the threshold value can be changed as appropriate. For example, it may be confirmed whether or not the current amount of waste ink in the waste ink tank 28 is equal to or greater than a threshold value. In this instance, for example, a different threshold value may be set for each of SC1 and SC2. Further, for example, a threshold value may be set for the amount that the waste ink tank 28 can accommodate, in other words, the remaining capacity, based on the amount of waste ink, or the like. Whether or not the remaining capacity is equal to or greater than the threshold value may be confirmed. Alternatively, a threshold value may be set as a threshold value for the usage ratio of the waste ink tank 28. That is, a threshold value may be set so that the total amount of waste ink does not exceed the capacity of the waste ink tank 28 when the system cleaning is executed.

Also, although in the present embodiment, the printing apparatus 1 executes two types of system cleaning in which the amounts of waste ink (amounts of suction by the suction pump 23) are different, it may be capable of executing three or more types of system cleaning in which the amounts of waste ink are different. Further, for example, when SC1 cannot be executed from the remaining capacity of the waste ink tank 28, the system cleaning may be executed so that the discharge amount of waste ink will be the remaining capacity of the waste ink tank 28.

Second Embodiment

<Configuration of Ink Tank (FIG. 17)>

Figure 17A:
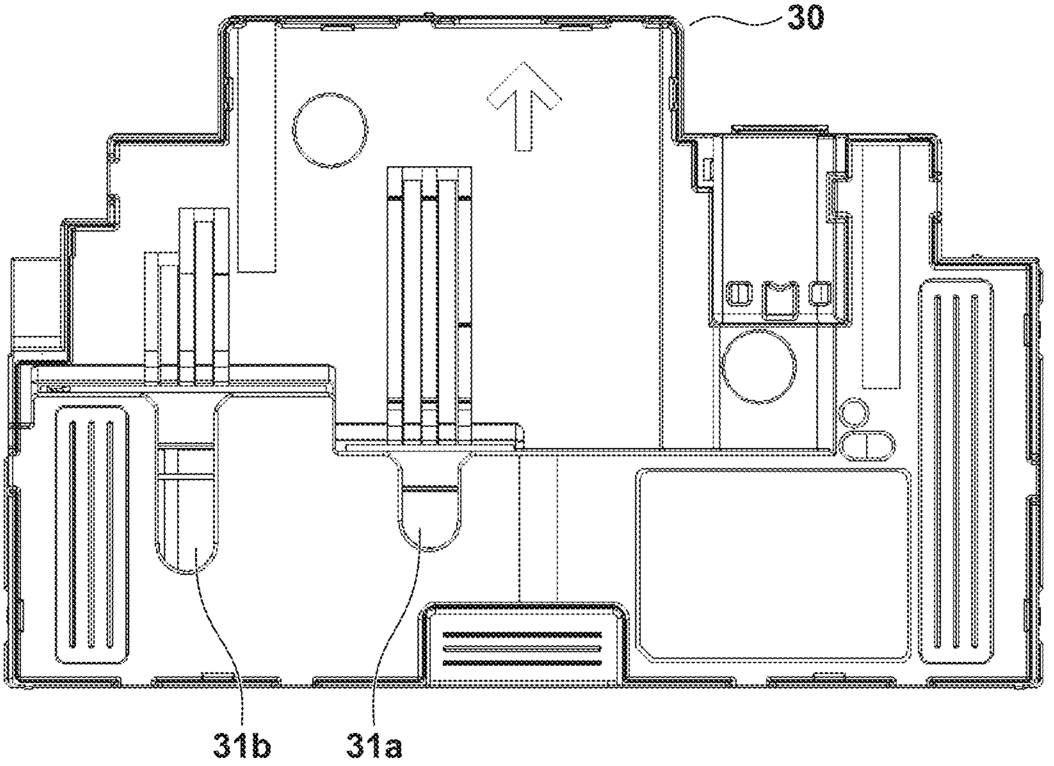
FIG. 17A is a detailed view illustrating the waste ink tank.
Figure 17B:
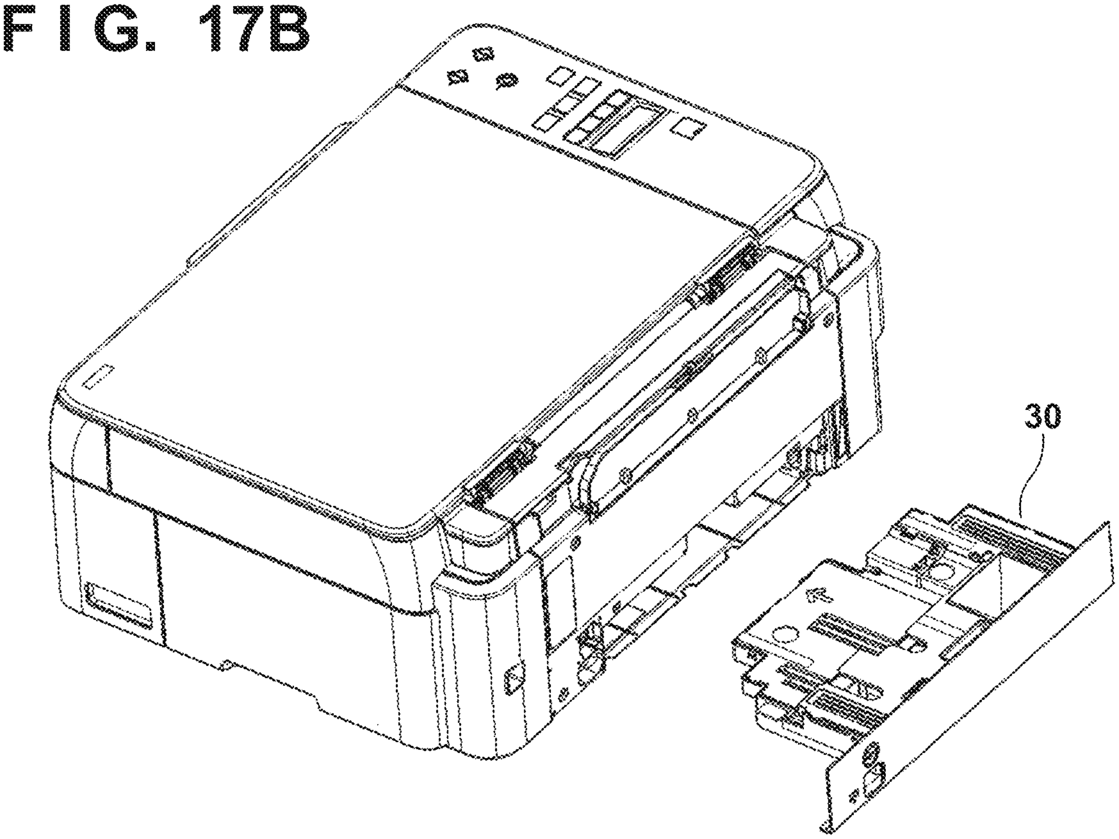
FIG. 17B is a view illustrating a state of attaching/detaching the waste ink tank.

FIG. 17A is a detailed view illustrating a waste ink tank 30 according to the second embodiment. FIG. 17B is a view illustrating a state of attaching/detaching the waste ink tank 30. Hereinafter, there are cases where the same components as those of the first embodiment are denoted by the same reference numerals and descriptions thereof are omitted.

In the present embodiment, the waste ink tank 30 is configured to be capable of being attached/detached to/from the main body of the printing apparatus 1. The ink discharged from the suction pump 23 is accommodated in the waste ink tank 30 via the waste ink tube 27. Color ink is discharged to a drip port 31*a*, and black ink is discharged to a drip port 31*b*. The ink discharged by the drip ports 31*a* and 31*b* is absorbed by an absorber incorporated in the waste ink tank 30. As illustrated in FIG. 17B, the waste ink tank 30 can be attached/detached from the printing apparatus 1.

<Description of Operation of System Cleaning (FIG. 18)>

Figure 18:
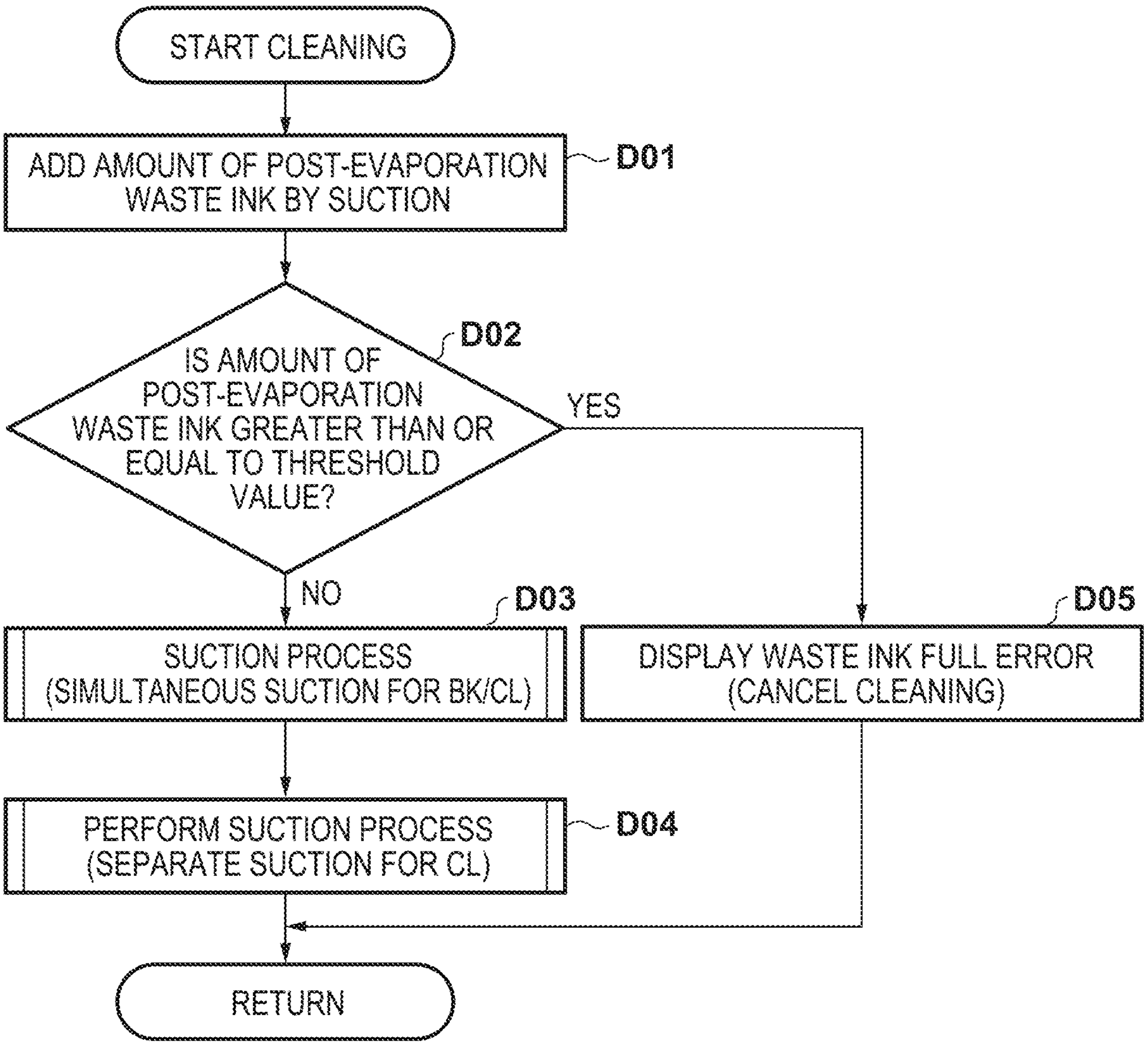
FIG. 18 is a flowchart illustrating a sequence of system cleaning.

FIG. 18 is a flowchart illustrating a sequence of the system cleaning. As an overview, this flowchart differs from the flowchart of FIG. 8 in that the evaporation amount of waste ink is taken into consideration, and in that the suction process is executed after the amount of waste ink by suction is added to the amount of waste ink stored in the non-volatile memory 4004 or the like. This flowchart also differs from the flowchart of FIG. 8 in that simultaneous suction of BK/CL is executed.

In D01, the control circuit 4000 implements addition of the amount of post-evaporation waste ink by suction. In this embodiment, addition is performed assuming that regarding the amount of waste ink discharged by suction, 50% evaporates over a predetermined time and 50% remains. The numerical value of the evaporation ratio can be appropriately set according to the shape of the waste ink tank 30, the atmospheric communication path provided in the waste ink tank 30, and the like.

Next, in D02, the control circuit 4000 confirms whether or not the amount of post-evaporation waste ink is equal to or greater than a threshold value, and when it is less than the threshold value, the suction process (simultaneous suction for BK/CL) is implemented in D03, and the suction process (separate suction for CL) is performed in D04. On the other hand, when the post-evaporation waste ink amount is equal to or greater than the threshold value in D02, the control circuit 4000 displays a waste ink full warning in D05 and cancels the cleaning operation. When the waste ink full error is displayed, all operations of the printing apparatus 1 are prohibited until the waste ink tank 30 is replaced.

<Relationship between Suction Parameters and Ink Filling Ratio (FIGS. 19 to 21)>

FIG. 19 is a table illustrating suction parameters for the system cleaning. In the present embodiment, the printing apparatus 1 can execute two types of system cleaning SC1 and SC2 as in the first embodiment.

In SC2, for both the simultaneous suction for BK/CL and the separate suction for CL, the driving speed is Y1, the driving amount is X2, and the number of times of driving is one. Also, in SC1, for both the simultaneous suction for BK/CL and the separate suction for CL, the driving speed and the number of times of driving are the same as SC2, but the driving amount X1 is at a lesser value than the driving amount X2. In the present embodiment, the driving amount X1=(½)*X2.

FIG. 20 is a table illustrating waste ink tank usage ratios of the system cleaning. When the waste ink full error threshold value is set to 100 in terms of the amount of post-evaporation waste ink, the amount of unevaporated waste ink of SC2 is 50 and the amount of post-evaporation waste ink is 25. Further, the amount of unevaporated waste ink of SC1 is 25, and the amount of post-evaporation waste ink is 12.5. When the waste ink discharged to the waste ink tank 30 evaporates, the amount that the waste ink tank 30 can accommodate increases by the amount of evaporation. Therefore, in the present embodiment, a threshold value of the waste ink full error in which evaporation of waste ink is taken into consideration is set.

Figure 21A:
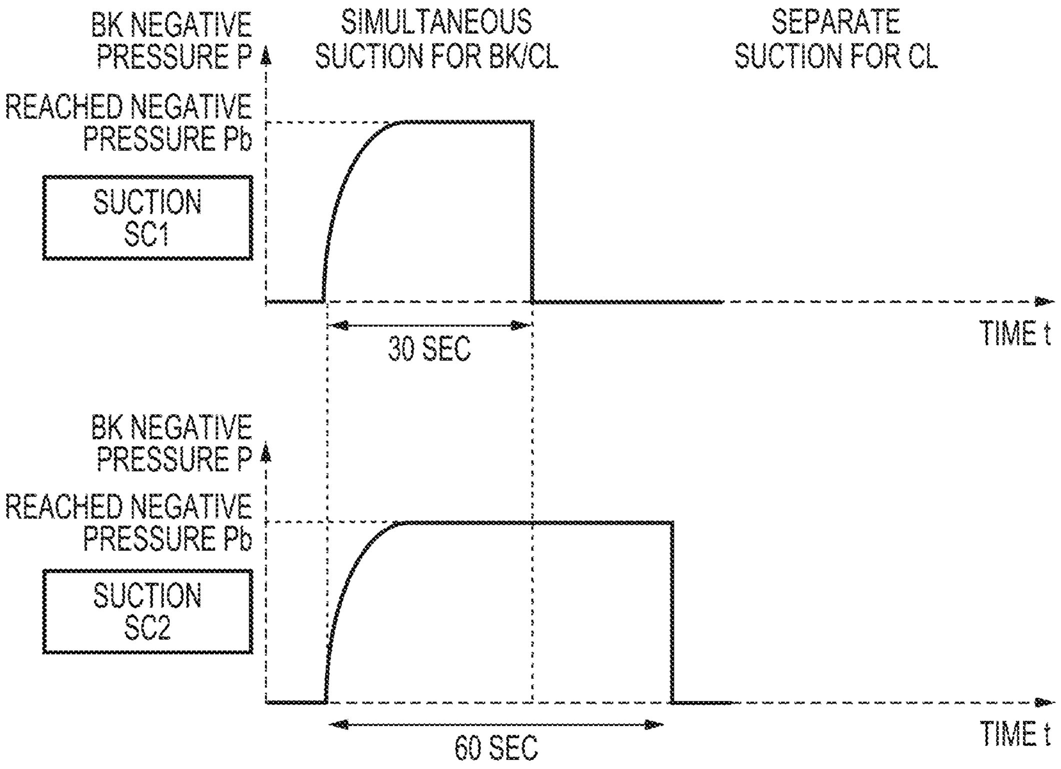
FIG. 21A is a schematic diagram of negative pressure profiles of system cleaning.
Figure 21B:
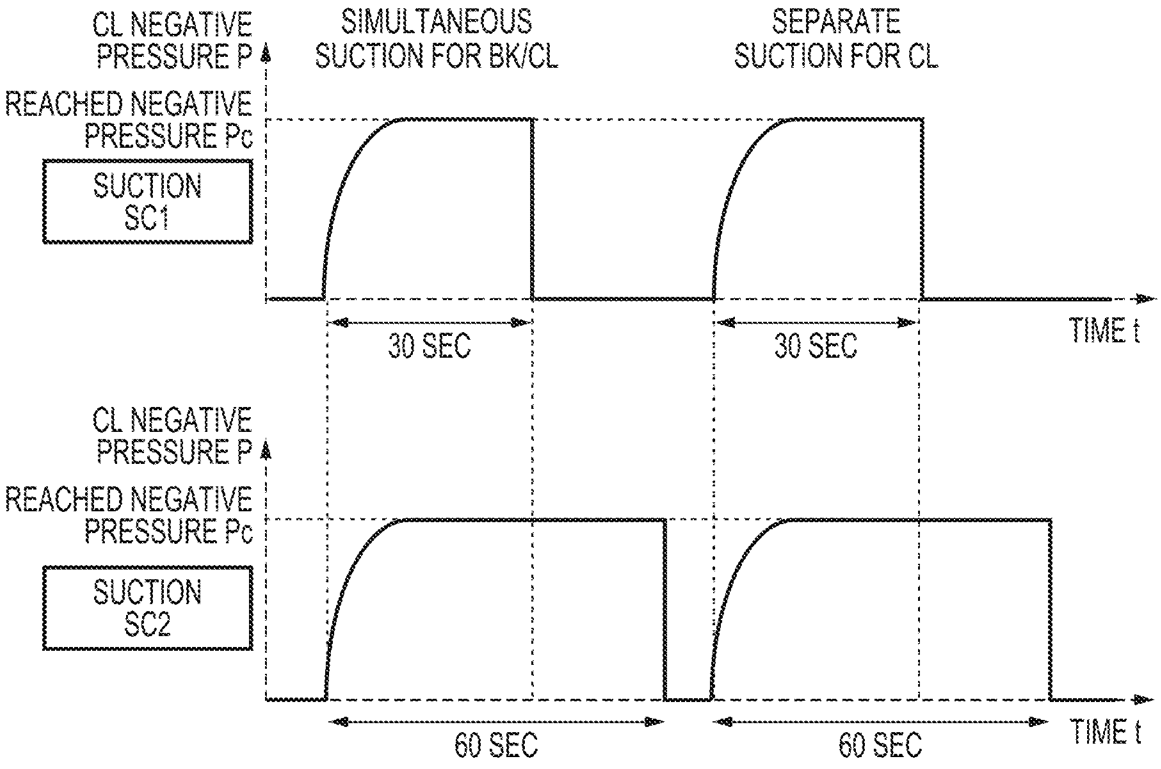
FIG. 21B is a schematic diagram of negative pressure profiles of system cleaning.

FIG. 21A and FIG. 21B are schematic diagrams of negative pressure profiles of the system cleaning. The upper diagram of FIG. 21A illustrates the waveform in the BK cap 20*b* in SC1, and the lower diagram illustrates the waveform in the BK cap 20*b* in SC2. The upper diagram of FIG. 21B illustrates the waveform in the CL cap 20*a* in SC1, and the lower diagram illustrates the waveform in the CL cap 20*a* in SC2.

In both SC1 and SC2, negative pressure waveforms have one peak in the BK cap 20*b* and two peaks in the CL cap 20*a*. In addition, since the driving speeds of SC1 and SC2 are the same, the reached negative pressures are the same. Also, since SC1 is the same as SC2 in driving speed and is less than SC2 in driving amount, the driving time is shorter than SC2.

<Processing Example of Recovery Process (FIG. 22)>

Figure 22:
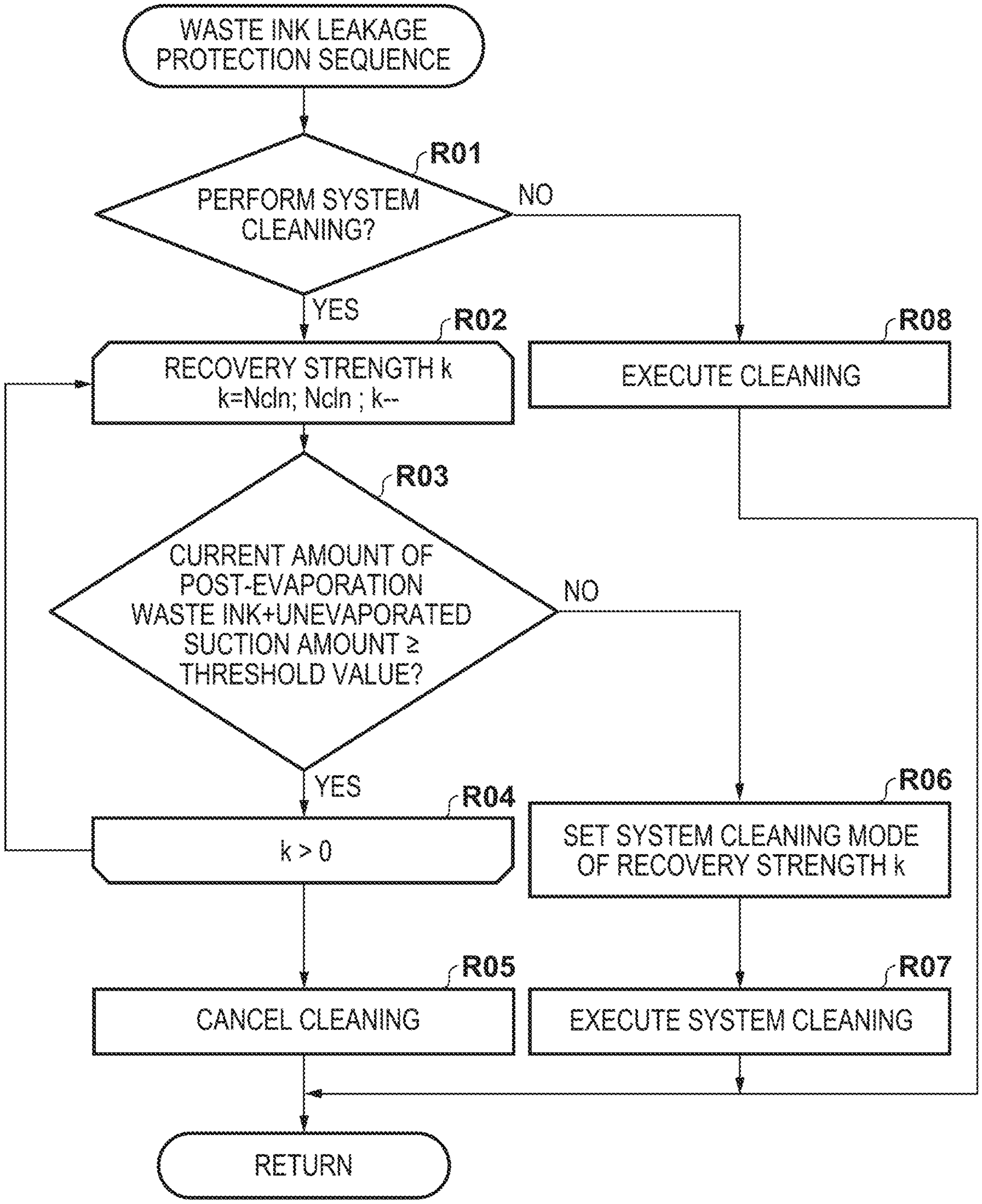
FIG. 22 is a flowchart illustrating a sequence of the recovery process.

FIG. 22 is a flowchart illustrating an example of a recovery process. R01, R02, R04, R05, R06, R07, and R08 respectively are the same processes as S01, S02, S04, S05, S06, S07, and S08 in FIG. 14, and, therefore, a description thereof is omitted.

As a difference from the process of FIG. 14, in R03, the current amount of "post-evaporation" waste ink and the amount of "unevaporated" waste ink of the system cleaning are added and a comparison with the waste ink full error threshold value is implemented. That is, the control circuit 4000 confirms in R03 whether or not (the current amount of post-evaporation waste ink+ the unevaporated suction amount) the threshold value. This is to avoid a risk that the discharged waste ink may overflow from the waste ink tank 30 if the threshold value is determined based on the amount of post-evaporation ink since a large amount of "unevaporated" ink is discharged to the waste ink tank 30 at the time of execution of the system cleaning. Note that since the amount of waste ink discharged to the waste ink tank 30 approaches the amount of post-evaporation ink illustrated in FIG. 20 with the elapse of a predetermined period of time, the value that is actually added as the amount of waste ink when the system cleaning is implemented is the "post-evaporation" value.

As described above, according to the present embodiment, the amount of waste ink in the system cleaning is determined based on the amount of post-evaporation waste ink of the waste ink tank 30, that is, the amount that is the evaporated amount subtracted from the total amount of waste ink discharged to the waste ink tank 30. Therefore, the amount of waste ink in the system cleaning can be determined in accordance with the actual amount of waste ink in the waste ink tank 30. Further, according to the present embodiment, compared to a case when the evaporation amount of waste ink is not taken into consideration, there are cases when the system cleaning can be executed even when the total amount of the unevaporated waste ink discharged to the waste ink tank 30 is great. Therefore, the printing apparatus 1 can continue the printing operation, or the like, longer. Further, it becomes possible to accommodate more waste ink in the waste ink tank 30.

Third Embodiment

In the third embodiment, when the waste ink tank 30 is replaced, the printing apparatus 1 additionally executes the system cleaning in accordance with the past execution status of the system cleaning. Specifically, it can be said that SC1 executes system cleaning to the extent possible by weakening the recovery strength when there is no room in the waste ink tank 30 to be able to execute SC2. Therefore, in the present embodiment, when the waste ink tank 30 is replaced after SC1 is executed and there is room in the amount that can be accommodated, the discharge performance of the print head 4 is sufficiently recovered by additionally executing the system cleaning. Hereafter, a configuration different from the first embodiment and the second embodiment will be mainly described, and a description of the same configuration may be omitted.

<Processing Example of Recovery Process (FIGS. 23 and 24)>

Figure 23:
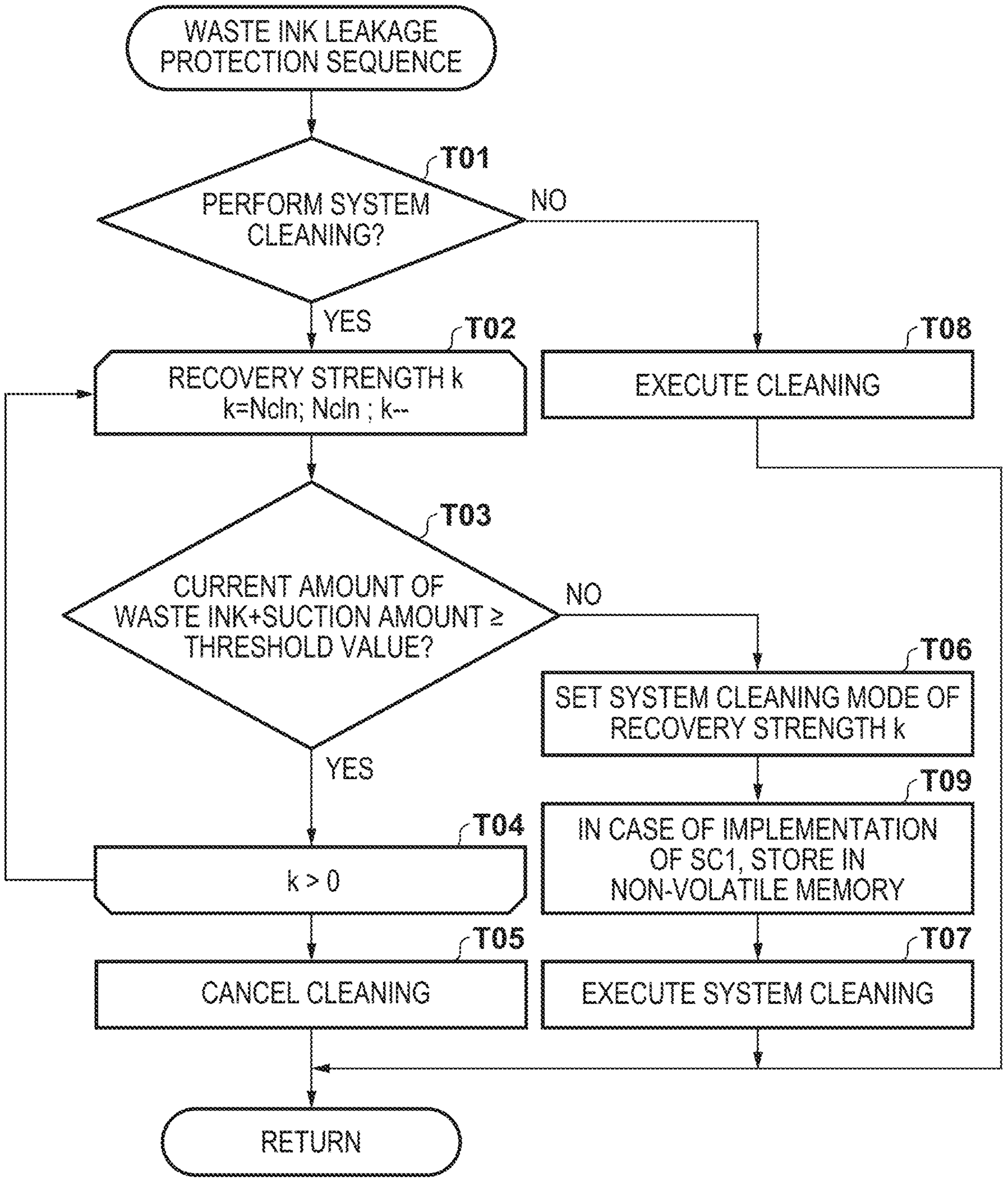
FIG. 23 is a flowchart illustrating a sequence of the recovery process.

FIG. 23 is a flowchart illustrating a sequence of a recovery process. Since T01 to T08 respectively are the same processes as S01 to S08 in FIG. 14, a description thereof is omitted.

As a difference from the process of FIG. 14, in the present embodiment, after the process of T06, if the system cleaning to be executed is SC1 at T09, the execution history is stored in the non-volatile memory 4004, and then the process proceeds to T07.

Figure 24:
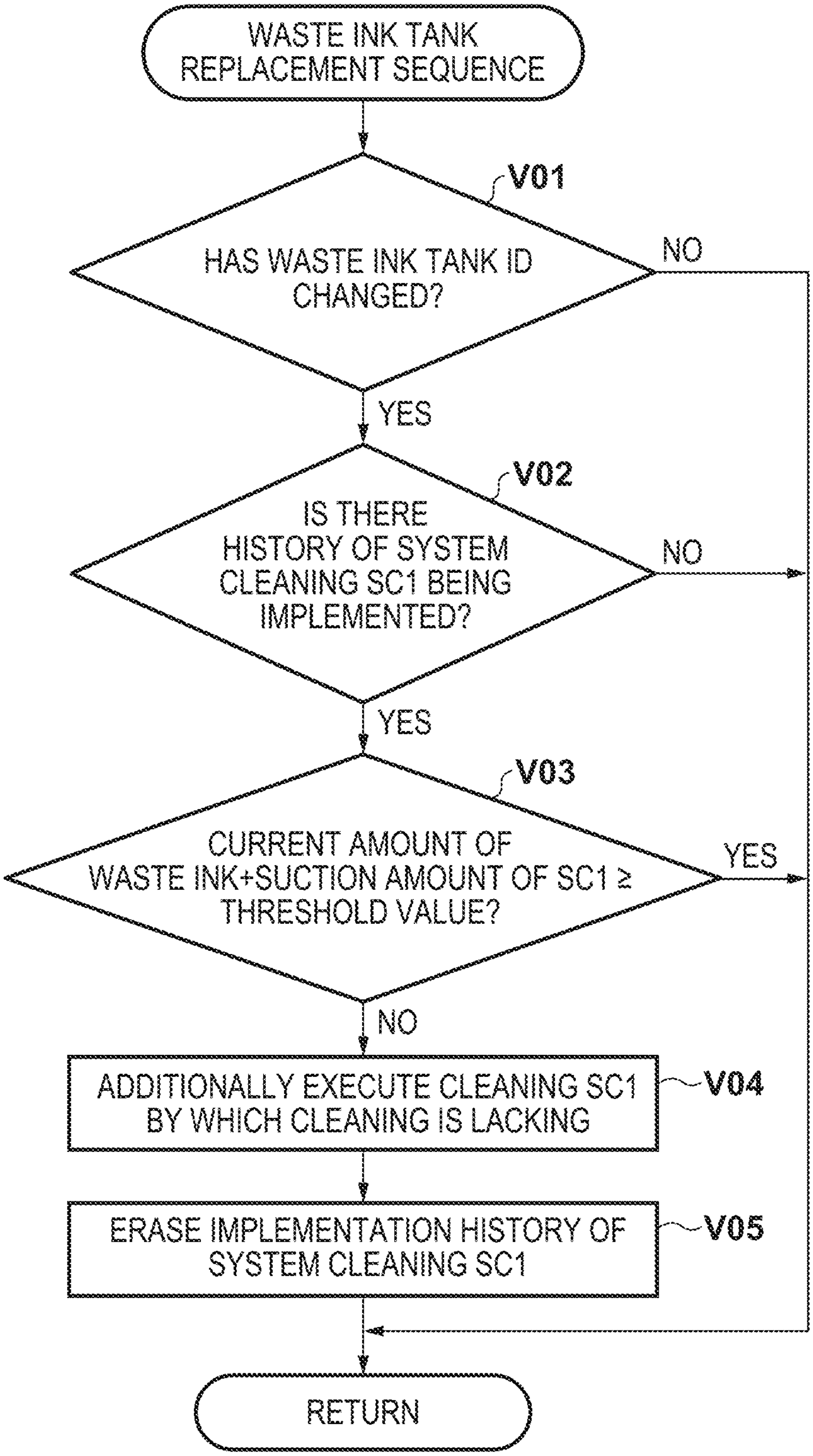
FIG. 24 is a flowchart illustrating a sequence of replacing the waste ink tank.

FIG. 24 is a flowchart illustrating a sequence of replacing the waste ink tank. This flowchart can be executed, for example, when the power of the printing apparatus 1 is turned on or at a predetermined cycle.

At V01, the control circuit 4000 determines whether or not the ID of the waste ink tank 30 has changed, proceeds to V02 if the ID has changed, and ends the flowchart if the ID has not changed. For example, the control circuit 4000 executes the determination by comparing the ID of the waste ink tank 30 stored in the non-volatile memory 4004 with the ID acquired from the waste ink tank 30 this time.

In V02, the control circuit 4000 confirms whether there is an implementation history of SC1, proceeds to V03 if there is a history, and ends the flowchart if there is no history. For example, the control circuit 4000 confirms whether or not the execution history of SC1 is stored in the non-volatile memory 4004. For example, when SC1 was executed according to the flow chart of FIG. 23 prior to replacing the waste ink tank 30, the implementation history is stored in the non-volatile memory 4004 by the process of T09.

In V03, the control circuit 4000 adds the suction amount of SC1 to the amount of waste ink of the waste ink tank 30 that is currently equipped, and confirms whether that is equal to or greater than the waste ink full error threshold value. That is, it is confirmed whether or not (the current amount of waste ink+ the suction amount)≥the threshold value. If it is less than the threshold value, the process proceeds to V04, and if it is equal to or greater than the threshold value, the flowchart is ended.

In V04, the control circuit 4000 additionally executes system cleaning of an amount by which the cleaning is lacking. In the present embodiment, the control circuit 4000 executes SC1 as the amount by which the cleaning is lacking.

Note that, in the present embodiment, since the amount of waste ink of SC1 is half the amount of waste ink of SC2, the amount of waste ink reaches the same as that of when SC2 is executed once by additionally executing SC1 once again after replacing the waste ink tank 30. For this reason, SC1 is executed as an additional system cleaning. However, additional system cleaning may be executed such that the amount of suction by the suction pump 23 is the difference between the suction amounts of SC2 and SC1. For example, if the amount of waste ink of SC1 is set to one-third of the amount of waste ink of SC2, additional system cleaning may be executed such that the amount of waste ink is two-thirds of that of SC2. Note that the condition of the system cleaning to be additionally executed may be determined based on the driving amount, the driving speed, the number of times of driving of the suction pump 23, and the like, aside from the amount of waste ink.

In V05, the control circuit 4000 erases the implementation history of SC1. Thereafter, the flowchart is ended.

As described above, according to the present embodiment, when the waste ink tank 30 is replaced, if there is a history of an execution of recovery process in which the suction amount of the suction pump 23 is reduced, that is, SC1, prior to the replacement, ink suction of the amount by which it was reduced is executed. This makes it possible to sufficiently restore the discharge performance of the print head 4, even in the case when the recovery process having a relatively low recovery strength was executed before the replacement of the waste ink tank 30.

Other Embodiments

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A liquid discharge apparatus comprising:

a print head including a nozzle that discharges a liquid;

a pump configured to suction the liquid from the nozzle of the print head, and configured to eject the liquid into a waste liquid tank;

a control unit configured to change a driving amount of the pump so as to control an amount of the liquid ejected from the nozzle to the waste liquid tank; and a calculation unit configured to calculate an amount of the liquid in the waste liquid tank, wherein the control unit is configured to drive the pump by a second driving amount less than a first driving amount, if a sum of an amount of the liquid ejected from the nozzle to the waste liquid tank in a case in which the pump is driven by the first driving amount and an amount of the liquid in the waste liquid tank is equal to or greater than a predetermined amount, and wherein the calculation unit is configured to calculate a cumulative amount of the liquid suctioned by the pump from the nozzle as the amount of the liquid in the waste liquid tank.

2. The liquid discharge apparatus according to claim 1, wherein the predetermined amount corresponds to a predetermined percentage of a maximum amount of which the waste liquid tank can accommodate, and a sum of the amount of the liquid ejected from the nozzle to the waste liquid tank in a case in which the pump is driven by the second driving amount and the amount of the liquid in the waste liquid tank is less than the predetermined amount.

3. The liquid discharge apparatus according to claim 2, wherein the calculation unit is configured to calculate an amount by subtracting an evaporation amount from the amount of the liquid in the waste liquid tank, and the control unit is configured to drive the pump by the second driving amount, if a sum of the amount of the liquid ejected from the nozzle to the waste liquid tank in the case in which the pump is driven by the first driving amount and the amount calculated by subtracting the evaporation amount from the amount of the liquid in the waste liquid tank is equal to or greater than a predetermined amount.

4. The liquid discharge apparatus according to claim 1, wherein the control unit is configured to cancel ejecting the liquid from the nozzle to the waste liquid tank by the pump, if the sum of the amount of the liquid ejected from the nozzle to the waste liquid tank in a case in which the pump is driven by the second driving amount and the amount of the liquid in the waste liquid tank is equal to or greater than the predetermined amount.

5. The liquid discharge apparatus according to claim 1, wherein the predetermined amount is an amount in which an evaporation amount has been subtracted from a total amount of waste liquid in the waste liquid tank.

6. The liquid discharge apparatus according to claim 1, wherein the waste liquid tank is arranged to be capable of being attached and detached to and from a main body of the liquid discharge apparatus.

7. The liquid discharge apparatus according to claim 1, further comprising:

a supply tank configured to accommodate a liquid to be supplied to the print head; and a path formation member configured to form a supply path of a liquid from the supply tank to the print head.

8. The liquid discharge apparatus according to claim 1, wherein the print head includes an absorber that absorbs a liquid.

9. The liquid discharge apparatus according to claim 1, wherein the calculation unit is configured to calculate an amount of the liquid suctioned by the pump from the nozzle as the amount of the liquid in the waste liquid tank.

10. The liquid discharge apparatus according to claim 1, further comprising a cap configured to cap the nozzle, wherein the pump is configured to suction the liquid from the nozzle through the cap.

11. A control method of controlling a liquid discharge apparatus including a print head including a nozzle that discharges a liquid, and a pump configured to suction the liquid from the nozzle of the print head and configured to eject the liquid into a waste liquid tank, the method comprising:

controlling the pump; and calculating an amount of the liquid in the waste liquid tank, wherein, in the controlling, the pump is driven by a second driving amount less than a first driving amount, if a sum of an amount of the liquid ejected from the nozzle to the waste liquid tank in a case in which the pump is driven by the first driving amount and an amount of the liquid in the waste liquid tank is equal to or greater than a predetermined amount, and wherein, in the calculating, a cumulative amount of the liquid suctioned by the pump from the nozzle is calculated as the amount of the liquid in the waste liquid tank.

12. The liquid discharge apparatus according to claim 11, wherein the predetermined amount corresponds to a predetermined percentage of a maximum amount of which the waste liquid tank can accommodate, and a sum of the amount of the liquid ejected from the nozzle to the waste liquid tank in a case in which the pump is driven by the second driving amount and the amount of the liquid in the waste liquid tank is less than the predetermined amount.

13. The control method according to claim 12, wherein, in the calculating, an amount by subtracting an evaporation amount from the amount of the liquid in the waste liquid tank is calculated, and, in the controlling, the pump is driven by the second driving amount, if a sum of the amount of the liquid ejected from the nozzle to the waste liquid tank in the case in which the pump is driven by the first driving amount and the amount calculated by subtracting the evaporation amount from the amount of the liquid in the waste liquid tank is equal to or greater than a predetermined amount.

14. The control method according to claim 11, wherein, in the controlling, ejecting the liquid from the nozzle to the waste liquid tank by the pump is canceled, if the sum of the amount of the liquid ejected from the nozzle to the waste liquid tank in a case in which the pump is driven by the second driving amount and the amount of the liquid in the waste liquid tank is equal to or greater than the predetermined amount.

15. The control method according to claim 11, wherein the predetermined amount is an amount in which an evaporation amount has been subtracted from a total amount of waste liquid in the waste liquid tank.

* * * * *